United States Patent
Reiter et al.

(10) Patent No.: US 6,243,467 B1
(45) Date of Patent: Jun. 5, 2001

(54) METHOD OF ELLIPTIC CURVE CRYPTOGRAPHIC DIGITAL SIGNATURE GENERATION AND VERIFICATION USING REDUCED BASE TAU EXPANSION IN NON-ADJACENT FORM

(75) Inventors: Robert W. Reiter, Woodbine; Jerome A. Solinas, Westminster, both of MD (US)

(73) Assignee: The United States of America as represented by the National Security Agency, Washington, DC (US)

( * ) Notice: Subject to any disclaimer, the term of this patent is extended or adjusted under 35 U.S.C. 154(b) by 0 days.

(21) Appl. No.: 09/120,740

(22) Filed: Jul. 23, 1998

(51) Int. Cl.$^7$ ........................................................ H04L 9/30
(52) U.S. Cl. ............................ 380/30; 713/176; 713/170; 713/180
(58) Field of Search ............................... 380/30; 713/176, 713/170, 180

(56) References Cited

U.S. PATENT DOCUMENTS

| | | |
|---|---|---|
| 4,200,770 | 4/1980 | Hellman et al. . |
| 4,405,829 | 9/1983 | Rivest et al. . |
| 4,567,600 | 1/1986 | Massey et al. . |
| 4,587,627 | 5/1986 | Omura et al. . |
| 4,995,082 | 2/1991 | Schnorr . |
| 5,231,668 | 7/1993 | Kravitz . |
| 5,497,423 | 3/1996 | Miyaji . |
| 5,581,616 | 12/1996 | Crandall . |
| 5,600,725 | 2/1997 | Rueppel et al. . |
| 5,604,805 | 2/1997 | Brands . |
| 5,606,617 | 2/1997 | Brands . |
| 5,761,305 | 6/1998 | Vanstone et al. . |

OTHER PUBLICATIONS

Francois Morain, Jorge Olivos, "Speeding Up the Computations on an Elliptic Curve Using Addition–Subtraction Chains," Sep. 12, 1990, "Theoretical Informatics and Applications", vol. 24, No. 6, 1990 pp. 531–544.
Neal Koblitz, "CM–Curves with Good Cryptographic Properties," Crypto '91, 1991, pp. 279–287.
Willi Meier, Othmar Staffelbach, "Efficient Multiplication on Certain Nonsupersingular Elliptic Curves," Crypto '92, 1992 pp. 333–344.
Solinas et al, An Improved Algorithm for Arithmetic on a Family of Elliptic Curves, Crypto '97, Springer, 1997.*
Weisstein, The CRC concise encyclopedia of mathematics, CRC Press LLC, 1999.*
Blake et al, Elliptic Curves in Cryptography, Cambridge University Press, 1999.*
Weyl, Algebraic Theory of Numbers, Princton University Press, 1940.*

\* cited by examiner

Primary Examiner—Gilberto Barron, Jr.
Assistant Examiner—Jeffrey Scott Leaning
(74) Attorney, Agent, or Firm—Robert D. Morelli

(57) ABSTRACT

A method of generating and verifying a digital signature by selecting an elliptic curve; selecting a point G; generating x and M; reducing x; generating a base tau expansion, in non-adjacent form, of the reduced x; multiplying G by the expansion; computing h=Hash(M); generating k; reducing k; generating a base tau expansion, in non-adjacent form, of the reduced k; multiplying G by the expansion of k to form $K=(K_x,K_y)$; computing $R=(K_x \bmod q)$; returning to the step of generating k if R=0, otherwise computing $S=(k^{-1})(h+xR)$; returning to the step of generating k if S=0, otherwise transmitting y, q, M, R, and S; receiving y, q, M, R, and S; proceeding with the next step if 0<R<q and 0<S<q, otherwise not verifying the digital signature and stopping; forming h=Hash(M); computing $f=((S^{-1}) \bmod q)$, $b=(hf \bmod q)$, and $t=(Rf \bmod q)$; reducing b and t; generating a base tau expansion, in non-adjacent form, of the reduced b; multiplies G by the result of the last step to form a point B; reduces t; generates a base tau expansion, in non-adjacent form, of the reduced b and t; multiplying G by the expansion of t; computing V=B+T, where $V=(V_x,V_y)$; computing $v=(V_x \bmod q)$; and verifying the digital signature if v=R, otherwise not verifying the digital signature.

30 Claims, 15 Drawing Sheets

METHOD OF ELLIPTIC CURVE CRYPTOGRAPHIC DIGITAL SIGNATURE GENERATION AND VERIFICATION USING REDUCED BASE TAU EXPANSION IN NON-ADJACENT FORM

FIELD OF THE INVENTION

This invention relates to cryptography and, more particularly, to the generation and verification of a discrete logarithm based digital signature on an elliptic curve using a reduced base tau expansion in non-adjacent form.

BACKGROUND OF THE INVENTION

The field of cryptography has spawned numerous devices and methods such as scramblers, symmetric-key encryptors, and public-key encryptors.

A scrambler is a device that receives an unencrypted message (i.e., plaintext) and produces an encrypted message (i.e., ciphertext). The encryption function of a scrambler is fixed in hardware and does not change from message to message. One of the problems with a scrambler is that the same plaintext will produce the same ciphertext. An adversary may collect ciphertext messages from a particular scrambler and compare them against each other in order to analyze a particular ciphertext message. To overcome this problem, the users may change the function of the scrambler periodically. Such a solution is time consuming and expensive.

Another solution to the problem associated with a scrambler is symmetric-key encryption. A symmetric-key encryptor has two inputs (i.e., plaintext and a cryptographic key). A cryptographic key is a message, or number, that should appear random to an adversary. A symmetric-key encryptor combines the cryptographic key with the plaintext using a scrambling function in order to generate ciphertext. The same plaintext may produce different ciphertext if the cryptographic key is changed. Since the cryptographic key is a message, or a number, it is much easier to change than the function of the scrambler which is built into hardware. In fact, the cryptographic key may be changed on a message to message basis without much difficulty. This method is called symmetric-key encryption because the intended recipient must possess the cryptographic key used to generate the ciphertext in order to recover the plaintext. The intended recipient must also possess a function that performs the inverse of the scrambling function used to generate the ciphertext. Typically, the inverse of the scrambling function may be the achieved by operating the scrambling function in reverse. If this is the case, the intended recipient must possess the same cryptographic key and the scrambling function used to generate the ciphertext in order to recover the plaintext.

Even though symmetric-key encryptors make the fastest encryptors they suffer from a few problems. The first problem is distributing cryptographic keys to authorized users in a secure fashion. A courier may be required to deliver the first cryptographic key to the users. This is time consuming and expensive. The second problem is knowing whether or not ciphertext came from a particular person. Anyone knowing the cryptographic key may encrypt or decrypt a message produced using a symmetric-key encryptor as long as they know the cryptographic key, the scrambling function, and the descrambling function.

U.S. Pat. No. 4,200,770, entitled "CRYPTOGRAPHIC APPARATUS AND METHOD," discloses a device for and method of performing a cryptographic key exchange over a public channel. The method is often called a public-key key exchange method or the Diffie-Hellman key exchange method after the first two named inventors of U.S. Pat. No. 4,200,770. The Diffie-Hellman key exchange method uses the exponentiation function to allow two users to conceal and transmit their secret information to the other user. The users then combine what they received with their secret information in order to generate the same cryptographic key. To recover the secret information that was transmitted and construct the cryptographic key, an adversary would have to find the logarithm of what was transmitted. If the values involved are large enough the logarithm, or discrete log, problem is believed to be intractable. U.S. Pat. No. 4,200,770 is hereby incorporated by reference into the specification of the present invention. The Diffie-Hellman key exchange method offers a solution to the symmetric-key key distribution problem, but it does not solve the problem of verifying the identity of the sender of the ciphertext.

Asymmetric-key, or public-key, encryption was proposed as a solution to identifying the sender of the ciphertext. This problem is often referred to as being able to provide, and verify, a digital signature. Two different, but mathematically related, cryptographic keys are used in asymmetric-key, or public-key, encryption. Typically, a first, or secret, key is used to generate ciphertext while a second, or public, key is used to recover the plaintext. Each user possesses their own secret key and mathematically related public key. Each user keeps their secret key secret and makes their public key public. A first user may now generate ciphertext using their secret key and a second user may recover the corresponding plaintext using the corresponding public key. If the first user is the only person who knows the first user's secret key then the second user is assured that the ciphertext came from the first user.

In the example just given, anyone knowing the first user's public key, which is everyone, could recover the corresponding plaintext. If two users wish to communicate securely with some assurance that the message is from a particular person, the first user would encrypt the plaintext using the first user's secret key then the intended recipient's public key to encrypt the ciphertext and something to identify the first user. The recipient would then use their secret key to recover the ciphertext and the identification material. The identification material is then used to identify the public key of the first user. The first user's public key is then used to recover the plaintext. If the first user is the only one who know's the first user's secret key and the intended recipient is the only one who knows the recipient's secret key then the recipient is the only one who can recover the plaintext and is assured that the ciphertext came from the first user.

U.S. Pat. No. 4,405,829, entitled "CRYPTOGRAPHIC COMMUNICATIONS SYSTEM AND METHOD," discloses one type of public-key encryption device and method known as RSA after the three names inventors Messrs. Rivest, Shamir, and Adleman. Although RSA uses exponentiation, an adversary is required to factor the product of two prime numbers used to generate the secret key from the chosen public key in order to recover plaintext. If the prime numbers are large enough, it is believed that the factoring problem is intractable. U.S. Pat. No. 4,405,829 is hereby incorporated into the specification of the present invention.

Taher ElGamal developed a public-key digital signature scheme based on the extended Euclidean algorithm. In this scheme, a first user generates a secret value x as the first user's secret key. The first user uses exponentiation to conceal the secret key and publishes the result (i.e., $y=g^x$ mod p) as the first user's public key. The first user then generates a random number k and uses exponentiation to conceal the random number (i.e., r=g^k mod p). The result r is one of two values that will be used as a signature for a message m from the first user. Next, the first user generates an equation that includes the message m, the secret key x, the random number k, the first half of the signature r, and a variable that represents the second half of the signature s (i.e., m=xa+ks (mod p−1)). The first user then solves the equation for s and transmits the message, the public key, and the two halves of the signature (i.e., r,s) to the recipient. The recipient, knowing p and g, checks to see if (y^r)(r^s) mod p=g^m mod p. If so, the recipient is assured that the transmission came from the first user.

The math associated with the ElGamal's digital signature scheme is complex and the digital signature is rather long. U.S. Pat. No. 4,995,082, entitled "METHOD FOR IDENTIFYING SUBSCRIBERS AND FOR GENERATING AND VERIFYING ELECTRONIC SIGNATURES IN A DATA EXCHANGE SYSTEM," discloses a method of generating a shorter digital signature in a secure manner that using different and less complex mathematics. U.S. Pat. No. 4,995,082 is hereby incorporated by reference into the specification of the present invention.

U.S. Pat. No. 5,231,668, entitled "DIGITAL SIGNATURE ALGORITHM," improves upon the digital signature of ElGamal by reducing the size of the digital signature but maintaining the mathematical complexity. U.S. Pat. No. 5,231,668 is hereby incorporated by reference into the specification of the present invention.

U.S. Pat. No. 5,497,423, entitled "METHOD OF IMPLEMENTING ELLIPTIC CURVE CRYPTOSYSTEMS IN DIGITAL SIGNATURES OR VERIFICATION AND PRIVACY COMMUNICATION"; U.S. Pat. No. 5,581,616, entitled "METHOD AND APPARATUS FOR DIGITAL SIGNATURE AUTHENTICATION"; U.S. Pat. No. 5,600,725, entitled "DIGITAL SIGNATURE METHOD AND KEY AGREEMENT METHOD"; U.S. Pat. No. 5,604,805, entitled "PRIVACY-PROTECTED TRANSFER OF ELECTRONIC INFORMATION"; U.S. Pat. No. 5,606,617, entitled "SECRET-KEY CERTIFICATES": and U.S. Pat. No. 5,761,305, entitled "KEY-AGREEMENT AND TRANSPORT PROTOCOL WITH IMPLICIT SIGNATURES," disclose either an elliptic curve version of the above-identified digital signature schemes or a different digital signature scheme. None of these elliptic curve digital signature schemes disclose a method of generating and verifying a digital signature such that the number of elliptic curve operations is minimizes as does the present invention.

The cryptographic strength of any method based on the Digital Signature Algorithm is based on the apparent intractability of finding a discrete logarithm, or discrete log, under certain conditions. In order for an adversary to recover concealed information, the adversary must be able to perform the inverse of exponentiation (i.e., a logarithm). There are mathematical methods for finding a discrete logarithm (e.g., the Number Field Sieve), but these algorithms cannot be done in any reasonable time using sophisticated computers if certain conditions are met during the construction of a transmission that conceals information (e.g., the numbers involved are large enough).

More precisely, the cryptographic strength of the Digital Signature Algorithm is based on the difficulty of computing discrete logs in a finite cyclic group. Mathematically, the discrete log problem is as follows. Let G be a finite cyclic group of order q, where g is a generator of G. Let r be a secret number such that 0<r<q. Given G, q, g, and g^r, where "^" denotes exponentiation, find r, where r is the discrete logarithm, or discrete log, of g^r. The discrete log problem is to find r.

In a Diffie-Hellman key exchange, two users (e.g., User A and User B) agree on a common G, g, and q. In practice, the most common choice for G is the integers mod n, where n is an integer.

Large digital signatures pose problems not only for the adversary but also for the users. Large digital signatures require large amounts of computational power and require large amounts of time in order to generate and use the digital signature. Cryptographers are always looking for ways to quickly generate the shortest digital signatures possible that meet the cryptographic strength required to protect the digital signature. The payoff for finding such a method is that cryptography can be done faster, cheaper, and in devices that do not have large amounts of computational power (e.g., hand-held smart-cards).

The choice of the group G is critical in a cryptographic system. The discrete log problem may be more difficult in one group and, therefore, cryptographically stronger than in another group, allowing the use of smaller parameters but maintaining the same level of security. Working with small numbers is easier than working with large numbers. Small numbers allow the cryptographic system to be higher performing (i.e., faster) and requires less storage. So, by choosing the right group, a user may be able to work with smaller numbers, make a faster cryptographic system, and get the same, or better, cryptographic strength than from another cryptographic system that uses larger numbers.

The classical choice for G in a digital signature scheme are integers mod n, where n is an integer as well. In 1985, Victor Miller and Neal Koblitz each suggested choosing G from elliptic curves. It is conjectured that choosing such a G allows the use of much smaller parameters, yet the discrete log problem using these groups is as difficult, or more difficult, than integer-based discrete log problems using larger numbers. This allows the users to generate a digital signature that has the same, or better, cryptographic strength as a digital signature generated from an integer G and is shorter than the integer-based digital signature. Since shorter digital signatures are easier to deal with, a cryptographic system based on a shorter digital signature may be faster, cheaper, and implemented in computationally-restricted devices. So, an elliptic curve Digital Signature Algorithm is an improvement over an integer-based Digital Signature Algorithm.

More precisely, an elliptic curve is defined over a field F. An elliptic curve is the set of all ordered pairs (x,y) that satisfy a particular cubic equation over a field F, where x and y are each members of the field F. Each ordered pair is called a point on the elliptic curve. In addition to these points, there is another point 0 called the point at infinity. The infinity point is the additive identity (i.e., the infinity point plus any other point results in that other point). For cryptographic purposes, elliptic curves are typically chosen with F as the integers mod p for some large prime number p (i.e., $F_p$) or as the field of 2^m elements (i.e., $F_2m$).

Multiplication or, more precisely, scalar multiplication is the dominant operation in elliptic curve cryptography. The speed at which multiplication can be done determines the performance of an elliptic curve method.

Multiplication of a point P on an elliptic curve by an integer k may be realized by a series of additions (i.e., kP=P+P+ . . . +P, where the number of Ps is equal to k). This is very easy to implement in hardware since only an elliptic adder is required, but it is very inefficient. That is, the number of operations is equal to k which may be very large.

The classical approach to elliptic curve multiplication is a double and add approach. For example, if a user wishes to realize kP, where k=25 then 25 is first represented as a binary expansion of 25. That is, 25 is represented as a binary number 11001. Next, P is doubled a number of times equal to the number of bits in the binary expansion minus 1. For ease in generating an equation of the number of operations, the number of doubles is taken as m rather than m−1. The price for simplicity here is being off by 1. In this example, the doubles are 2P, 4P, 8P, and 16P. The doubles correspond to the bit locations in the binary expansion of 25 (i.e., 11001), except for the 1s bit. The doubles that correspond to bit locations that are is are then added along with P if the is bit is a 1. The number of adds equals the number of 1s in the binary expansion. In this example, there are three additions since there are three 1s in the binary expansion of 25 (i.e., 11001). So, 25P=16P+8P+P.

On average, there are m/2 1s in k. This results in m doubles and m/2 additions for a total of 3m/2 operations. Since the number of bits in k is always less than the value of k, the double and add approach requires fewer operations than does the addition method described above. Therefore, the double and add approach is more efficient (i.e., faster) than the addition approach.

While working on an elliptic curve allows smaller parameters relative to a modular arithmetic based system offering the same security, some of the efficiency advantage of smaller parameters is offset by the added complexity of doing arithmetic on an elliptic curve as opposed to ordinary modular arithmetic. For purposes of determining efficiency, elliptic doubles and elliptic additions are often grouped and considered elliptic operations. To gain even more efficiency advantages by going to elliptic curves, cryptographers seek ways to reduce the cost of an elliptic curve operation, or reduce the number of elliptic operations required. An elliptic curve method that requires fewer operations, or more efficiently executable operations, would result in an increase in the speed, or performance, of any device that implements such a method.

It is no more costly to do elliptic curve subtractions than it is to do elliptic curve additions. Therefore, a doubles and add approach to doing elliptic curve multiplication may be modified to include subtraction where appropriate. There are an infinite number of ways to represent an integer as a signed binary expansion. The negative 1s in a signed binary expansion indicate subtraction in a double/add/subtract method while the positive is in the signed binary expansion indicate addition in the double/add/subtract method. For example, 25 may be represented as an unsigned binary number 11001 (i.e., 16+8+1=25) or as one possible signed binary number "1 0 −1 0 0 1" (i.e., 32−8+1=25).

In an article entitled "Speeding Up The Computations On An Elliptic Curve Using Addition-Subtraction Chains", authored by Francois Morain and Jorge Olivos, published in *Theoretical Informatics and Applications*, Vol. 24, No. 6, 1990, pp. 531–544, the authors disclose an improvement to the double/add/subtract method mentioned above by placing a restriction on the signed binary expansion that results in fewer elliptic additions being required to do an elliptic curve multiplication and, therefore, increase the performance (i.e., speed) of elliptic curve multiplication. Messrs. Morain and Olivos proposed generating a signed binary expansion such that no two adjacent bit locations in the signed binary expansion are non-zero (i.e., two 1s, irrespective of polarity, may not be next to each other). Such a signed binary expansion is called a non-adjacent form (NAF) of a signed binary expansion. It has been shown that a NAF signed binary expansion is unique (i.e., each integer has only one NAF signed binary expansion) and contains the minimum number of 1s, irrespective of polarity. By minimizing the 1s, the number of additions is minimized. The improvement proposed by Messrs. Morain and Olivos still requires m doubles but only requires an average of m/3 additions for a total of 4m/3 elliptic curve operations. This is less than the 3m/2 elliptic curve operations required by the classical double and add method described above.

In an article entitled "CM-Curves With Good Cryptographic Properties", authored by Neal Koblitz, published in *Crypto '91*, 1991, pp. 279–287, the author discloses an improvement to the double/add/subtract method mentioned above by working in a particular family of elliptic curves (i.e., Koblitz Curves). Koblitz Curves are characteristic 2 curves of the form $$E_a: y^2 + xy = x^3 + a(x^2) + b, \text{ where "a" and "b" are members of } F_2.$$

The group on which the key agreement is based is the group of $F_2m$-rational points on $E_a$, which is chosen to have a low complexity normal basis. To operate on such curves, the multiplier k is expanded in powers of a complex number as follows:

$$\tau = ((-1)^{\wedge}a + ((-7)^{\wedge}0.5))/2.$$

The expansion is referred to as a base tau expansion. Similar to the binary expansions, the base tau expansion requires the analog of a double for each term in the expansion and an add for each non-zero term in the expansion. A property of these curves and normal basis representation is that the analog of doubling can be performed by a circular shift of bits and is, effectively, free. U.S. Pat. No. 4,567,600, entitled "METHOD AND APPARATUS FOR MAINTAINING THE PRIVACY OF DIGITAL MESSAGES CONVEYED BY PUBLIC TRANSMISSION," and U.S. Pat. No. 4,587,627, entitled "COMPUTATIONAL METHOD AND APPARATUS FOR FINITE FIELD ARITHMETIC," each disclose the method of getting the analog of doubles for free, but neither of these patents disclose the method of the present invention. U.S. Pat. Nos. 4,567,600 and 4,587,627 are each hereby incorporated by reference into the specification of the present invention. A downside of the base tau expansion is that it is 2m-bits long for a k that is m-bits long. Another downside to the base tau expansion is that the rule for getting a minimum number of non-zero terms that was used in the binary case does not work for the base tau expansion. On average, ⅜ of the base tau expansion is non-zero. Since the base tau expansion is 2m-bits long, the total number of elliptic curve operations is expected to be (⅜)×2m=3m/4. This is less than the 4m/3 elliptic curve operations required by the non-adjacent form (NAF) of the double/add/subtract method described above.

In an article entitled "Efficient Multiplication on Certain Nonsupersingular Elliptic Curves", authored by Willi Meier and Othmar Staffelbach, published in *Crypto '92*, 1992, pp. 333–343, the authors disclose an improvement to the base tau expansion described above. Messrs. Meier and Staffelbach disclose a method of generating a base tau expansion that is only m-bits long. They achieve this result by reducing k by $\mod(\tau^m - 1)$ and multiplying P by the $(k \mod(\tau^m - 1))$. One-half of the terms of this reduced base tau expansion is non-zero. So, the expected number of elliptic curve operations for the reduced base tau expansion is mx(½)=m/2. This is less than the 3m/4 elliptic curve operations required by the non-reduced base tau expansion method described above.

The present invention discloses an discrete log based digital signature method on an elliptic curve that requires fewer elliptic curve operations than the prior art methods listed above.

SUMMARY OF THE INVENTION

It is an object of the present invention to securely generate and verify a digital signature.

It is another object of the present invention to securely generate and verify a digital signature based on the discrete logarithm problem.

It is another object of the present invention to securely generate and verify a digital signature based on the discrete logarithm problem and on an elliptic curve.

It is another object of the present invention to securely generate and verify a digital signature based on the discrete logarithm problem and on an elliptic curve in a manner that minimizes the total number of elliptic curve operations for an elliptic curve multiplication.

Elliptic curve multiplication is the operation that determines the efficiency (i.e., speed) of an elliptic curve cryptographic method such as a digital signature method of the present invention.

The present invention is a method of generating and verifying a discrete log based digital signature on an elliptic curve in a manner that requires the fewest total number of elliptic curve operations for an elliptic curve multiplication than any presently known method. The present method uses a reduced base tau expansion in non-adjacent form (NAF) on a Koblitz Curve to require only m/3≈0.33m total number of elliptic curve operations for an elliptic curve multiplication, where m is the number of bits in k, and where k in the multiplier of an elliptic curve point P (i.e., kP). This compares favorably with the repeated addition method described above which requires k≈2^m total elliptic curve operations for an elliptic curve multiplication, the double and add method described above which requires 3m/2=1.5m operations, the non-adjacent form binary expansion method described above which requires 4m/3≈1.33m operations, the base tau expansion on a Koblitz Curve method described above which requires 3m/4=0.75m operations, and the reduced base tau expansion on Koblitz Curves described above which requires m/2=0.5m operations. Note that the steps of the non-adjacent form binary expansion do not apply to a base tau expansion. Therefore, the present method performs the basic elliptic curve operation with 33% fewer operations than the next best method presently known.

The method of the present involves two parts. The first part is for a first user (e.g., User A) to generate a digital signature and transmit it to a second user (e.g., User B). The second part is for User B to verify the digital signature.

In the first digital signature generation step, User A picks a characteristic 2 elliptic Koblitz Curve defined as follows:

$$E_a: y^2 + xy = x^3 + a(x^2) + 1,$$

where "a" is a member of field $F_2$. The digital signature generation is performed over the field $F_2m$, where m is an integer. User A also picks a base point $G=(G_x, G_y)$ on the elliptic curve, where G is of order q.

In the second digital signature generation step, User A generates a signature key x and a message M, where x and M are integers.

In the third digital signature generation step, User A reduces x by modulo ($\tau^m - 1$), where $\tau=((-1)^a + ((-7)^0.5))/2$ and generates a base tau expansion, in non-adjacent form, of the reduced x.

In the fourth digital signature generation step, User A multiplies G by the base tau expansion, in non-adjacent form, of the reduced x to form the point y on the elliptic curve, where $y=(y_x, y_y)$.

In the fifth digital signature generation step, User A forms a hash of the message (i.e., h=Hash(M), where Hash is a suitable and secure one-way hash function).

In the sixth digital signature generation step, User A generates a private integer k, reduces k modulo ($\tau^m - 1$), and generates a base tau expansion, in non-adjacent form, of the reduced k.

In the seventh digital signature generation step, User A multiplies G by the base tau expansion, in non-adjacent form, of the reduced k to form the point K on the elliptic curve, where $K=(K_x, K_y)$.

In the eighth digital signature generation step, User A computes $R=K_x$ mod q, where the bit stream representing $K_x$ is interpreted as an integer. If R=0 then the next step is to return to the sixth step described above and proceed from there. If R≠0 then the next step is the ninth step listed below.

In the ninth digital signature generation step, User A computes $S=(k^{-1})(h+xR)$. If S=0 then the next step is to return to the sixth step described above and proceed from there. If S≠0 then the next step is the tenth step listed below.

In the tenth and final digital signature generation step, User A transmits y, q, M, R, and S to User B.

User B performs the following steps in order to verify the digital signature (R,S) transmitted by User A.

In the first digital signature verification step, User B receives y, q, M, R, and S from User A.

In the second digital signature verification step, User B checks to see whether or not 0<R<q and 0<S<q. If 0<R<q and 0<S<q then proceed to the next step, otherwise stop. If processing is stopped then the digital signature received is not verified.

In the third digital signature verification step, User B form the hash of M (i.e., h=Hash(M), where Hash is the same hash function used by User A).

In the fourth digital signature verification step, User B computes $f=(S^{-1})$ mod q.

In the fifth digital signature verification step, User B computes b=hf mod q and t=Rf mod q.

In the sixth digital signature verification step, User B reduces b by modulo ($\tau^m - 1$) and generates a base tau expansion, in non-adjacent form, of the reduced b.

In the seventh digital signature verification step, User B multiplies G by the base tau expansion of the reduced b to form the point B on the elliptic curve, where $B=(B_x, B_y)$ In the eighth digital signature verification step, User B reduces t by modulo ($\tau^m - 1$) and generates a base tau expansion, in non-adjacent form, of the reduced t.

In the ninth digital signature verification step, User B multiplies G by the base tau expansion of the reduced t to form the point T on the elliptic curve, where $T=(T_x, T_y)$.

In the tenth digital signature verification step, User B computes the point V=B+T on the elliptic curve, where $V=(V_x, V_y)$. Note that elliptic curve addition is required to add elliptic curve points B and T.

In the eleventh digital signature verification step, User B computes an integer $v=V_x$ mod q, where the bit string representing the coordinate $V_x$ of the point V on the elliptic curve is interpreted as an integer.

In the twelfth and last digital signature verification step, User B checks to see if v=R. If v=R then the digital signature is verified. Otherwise, the digital signature is not verified.

DETAILED DESCRIPTION

The present invention is a method of generating and verifying a discrete log based cryptographic digital signature on an elliptic curve in a manner that requires the fewest total number of elliptic curve operations for an elliptic curve multiplication than any method known presently. The present method uses a reduced base tau expansion in non-adjacent form (NAF) on an Koblitz Curve to require only $m/3 \approx 0.33m$ total number of elliptic curve operations for an elliptic curve multiplication, where m is the number of bits in k, and where k is the multiplier of an elliptic curve point P (i.e., kP). This compares favorably with the repeated addition method described above which requires $k \approx 2^m$ total elliptic curve operations for an elliptic curve multiplication, the double and add method described above which requires $3m/2=1.5m$ operations, the non-adjacent form binary expansion method described above which requires $4m/3 \approx 1.33m$ operations, the base tau expansion on a Koblitz Curve method described above which requires $3m/4=0.75m$ operations, and the reduced base tau expansion on Koblitz Curves described above which requires $m/2=0.5m$ operations. Note that the steps of the non-adjacent form binary expansion do not apply to a base tau expansion. Therefore, the present method performs the basic elliptic curve operation with 33% fewer operations than the next best method presently known.

Figure 1:
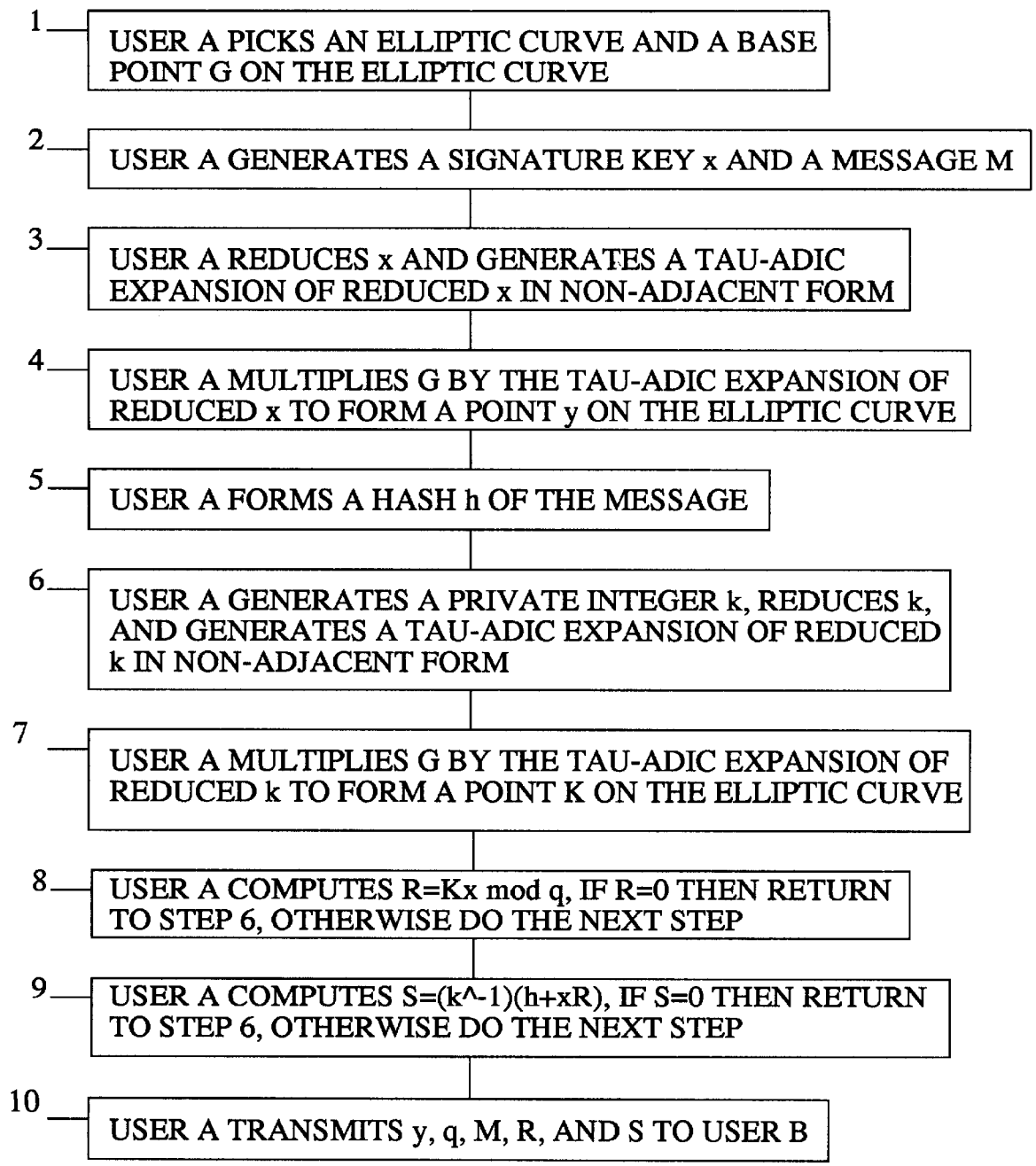
FIG. 1 is a list of steps for generating a digital signature in accordance with the present invention.

FIG. 1 is a list of steps for generating a digital signature according to the present invention. The first step 1 for generating a digital signature is for a first user (e.g., User A) who wish to send a message that is signed digitally to a second user (e.g., User B) to select a characteristic 2 elliptic Koblitz Curve defined as follows:

$$E_a: y^2+xy=x^3+a(x^2)+1,$$

where "a" is a member of field $F_2$. The digital signature generation is performed over the field $F_2m$, where m is an integer. User A also selects a base point $G=(G_x,G_y)$ on the elliptic curve, where G is of order q.

The second step 2 for generating a digital signature is for User A to generate a private signature key x and a message M, where x and M are both integers. The following steps are performed in order to protect the private signature key so that an adversary may not recover the private signature key from information transmitted over a public channel and other public information. The elliptic curve analogue to integer exponentiation is used to protect the private signature key. For an adversary to mathematically recover the private signature key, the adversary must solve a discrete logarithm problem. Such a problem is considered intractable if the parameters used to protect the private signature key meet certain characteristics (e.g., are long enough etc.). Elliptic curve multiplication is mathematically analogous to integer exponentiation.

The third step 3 for generating a digital signature is for User A to reduce x by modulo $(\tau^m-1)$, where $\tau=((-1)^a+((-7)^{0.5}))/2$ and to generate a base tau expansion of the reduced x in non-adjacent form. The exact steps of generating (x mod $(\tau^m-1)$) and generating a base tau expansion of (x mod $(\tau^m-1)$) are described below and are listed in FIG. 2, FIG. 3, and FIG. 4.

The fourth step 4 for generating a digital signature as listed in FIG. 1 is for User A to multiply the base point G by the base tau expansion, in non-adjacent form, of the reduced x to form a point y on the elliptic curve. The point y is a public signature key that corresponds to the private signature key x. The exact details of the multiplication are described below and are listed in FIG. 5.

The fifth step 5 of generating a digital signature as listed in FIG. 1 is for User A to for a hash h of the message M (i.e., h=Hash(M), where "Hash" is any suitable secure one way hash function). A hash function is a function that takes in an input of a certain length and puts out a signal based on the input that is of a shorter length. Examples of suitable one-way hash functions include the Secure Hash Algorithm (i.e., SHA) and the various versions of Message Digest (e.g., MD2, MD4, and MD5). SHA is disclosed in NIST FIPS PUB 186, entitled Digital Signature Standard, The sixth step 6 for generating a digital signature is for User A to generate a private integer k, reduce k by modulo $(\tau^m-1)$, and generate a base tau expansion, in non-adjacent form, for the reduced k. The exact steps of generating (k mod $(\tau m-1)$) and generating a base tau expansion of (k mod $(\tau^m-1)$) are described below and are listed in FIG. 6 and FIG. 7. Note that the result of FIG. 2 (i.e., expressing $(\tau^m-1)$ as $(j_1+j_2\tau)$) is used in FIG. 6.

The seventh step 7 for generating a digital signature as listed in FIG. 1 is for User A to multiply the base tau expansion, in non-adjacent form, of the reduced k by G to form a point K on the elliptic curve, where $K=(K_x,K_y)$. The exact details of the multiplication are described below and are listed in FIG. 8.

The eighth step 8 for generating a digital signature as listed in FIG. 1 is for User A to compute $R=(K_x \mod q)$, where $K_x$ is the x-coordinate of the point K generated in the seventh step 7 above. If R=0 then the next step is to return to the sixth step 6 above and proceed from there. Otherwise, proceed to the ninth step 9 below and proceed from there.

The ninth step 9 for generating a digital signature is for User A to compute $S=(k^{\wedge}-1)(h+xR)$. If S=0 then the next step is to return to the sixth step 6 above and proceed from there. Otherwise, proceed to the tenth step 10 below.

Figure 2:
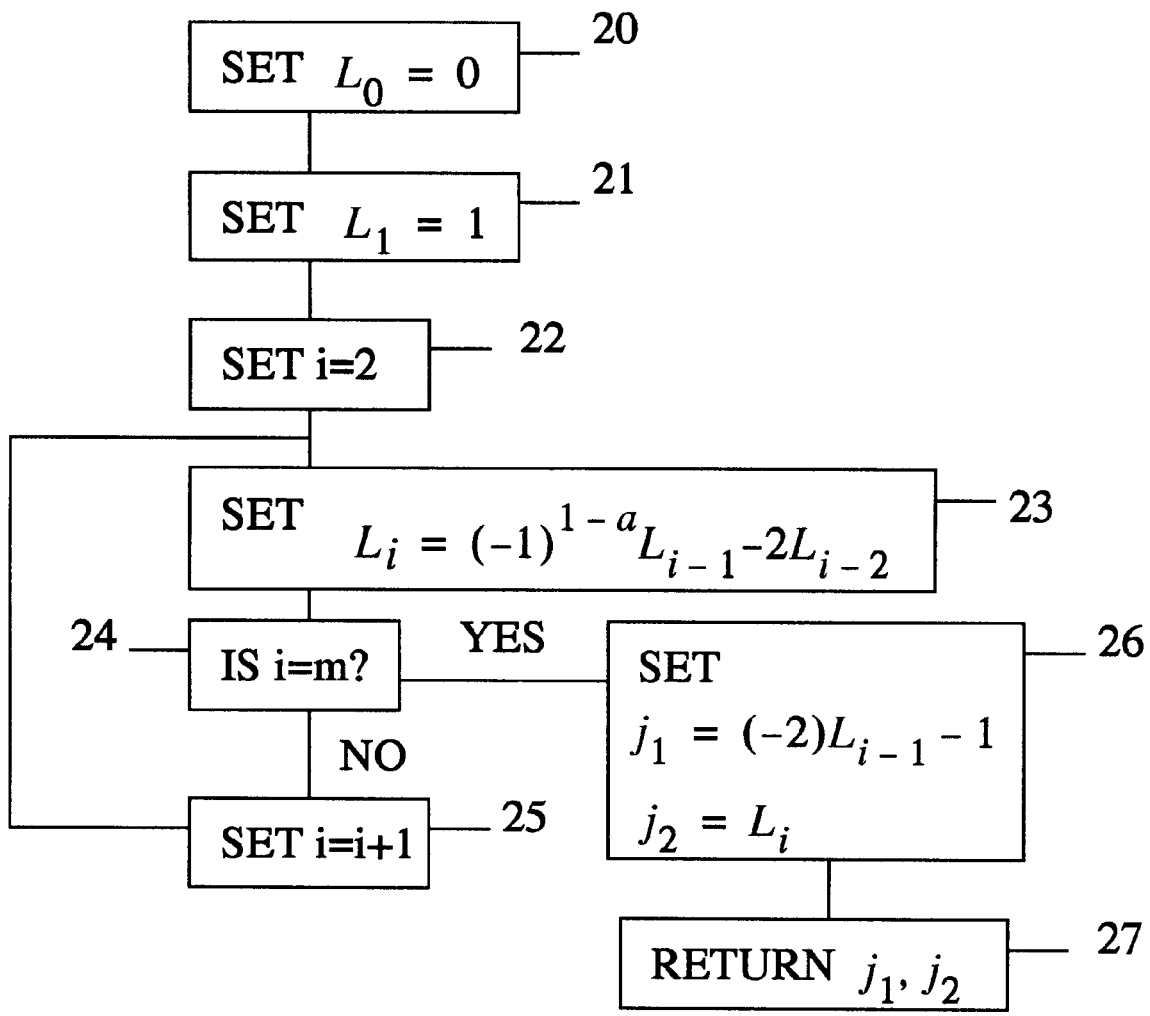
FIG. 2 is a list of steps for expressing $(\tau^m-1)$ as $j_1+j_2\tau$.

The tenth and final step 10 for generating a digital signature is for User A to transmit y, q, M, R, and S to User B. The digital signature for the message M is the pair (R,S). The point y is the public signature key corresponding to User A's private signature key and q is the order of the base point G. User B must know q in order to perform checks and modulo reductions. FIG. 2 lists some of the steps necessary to accomplish the portion of the third step 3 listed in FIG. 1 of reducing x by mod $(\tau^m-1)$. The steps listed in FIG. 2 result in expressing $(\tau^m-1)$ in the form of $j_1+j_2\tau$. The expression resulting from the steps listed in FIG. 2 will also be used below in the steps listed in FIG. 6, FIG. 10, and FIG. 13.

The first step 20 listed in FIG. 2 is to set a parameter $L_0$ equal to zero.

The second step 21 listed in FIG. 2 is to set a second parameter $L_1$ equal to one.

The third step 22 listed in FIG. 2 is to set a third parameter i equal to two.

The fourth step 23 listed in FIG. 2 is to change the value of the parameter $L_i$ according to the present value of i as follows:

$$L_i=(-1)^{1-a}L_{i-1}-2L_{i-2},$$

where "a" is the parameter used to described the particular elliptic curve selected by User A (i.e., $y^2+xy=x^3+ax^2+1$).

The fifth step 24 listed in FIG. 2 is to determine whether or not parameter i is equal to m, where m is the integer used to define the field $F_{2^m}$ of the selected elliptic curve.

If parameter i is not equal to m then the next step 25 is to increment parameter i by one and return to the fourth step 23 for further processing.

If parameter i is equal to m then the next step 26 is to set $j_1=-2L_{i-1}-1$ and set $j_2=L_i$.

The final step 27 listed in FIG. 2 is to return $j_1$ and $j_2$. Note that $j_1$ and $j_2$ will also be used in the steps listed below in FIG. 6, FIG. 10, and FIG. 13.

Figure 3:
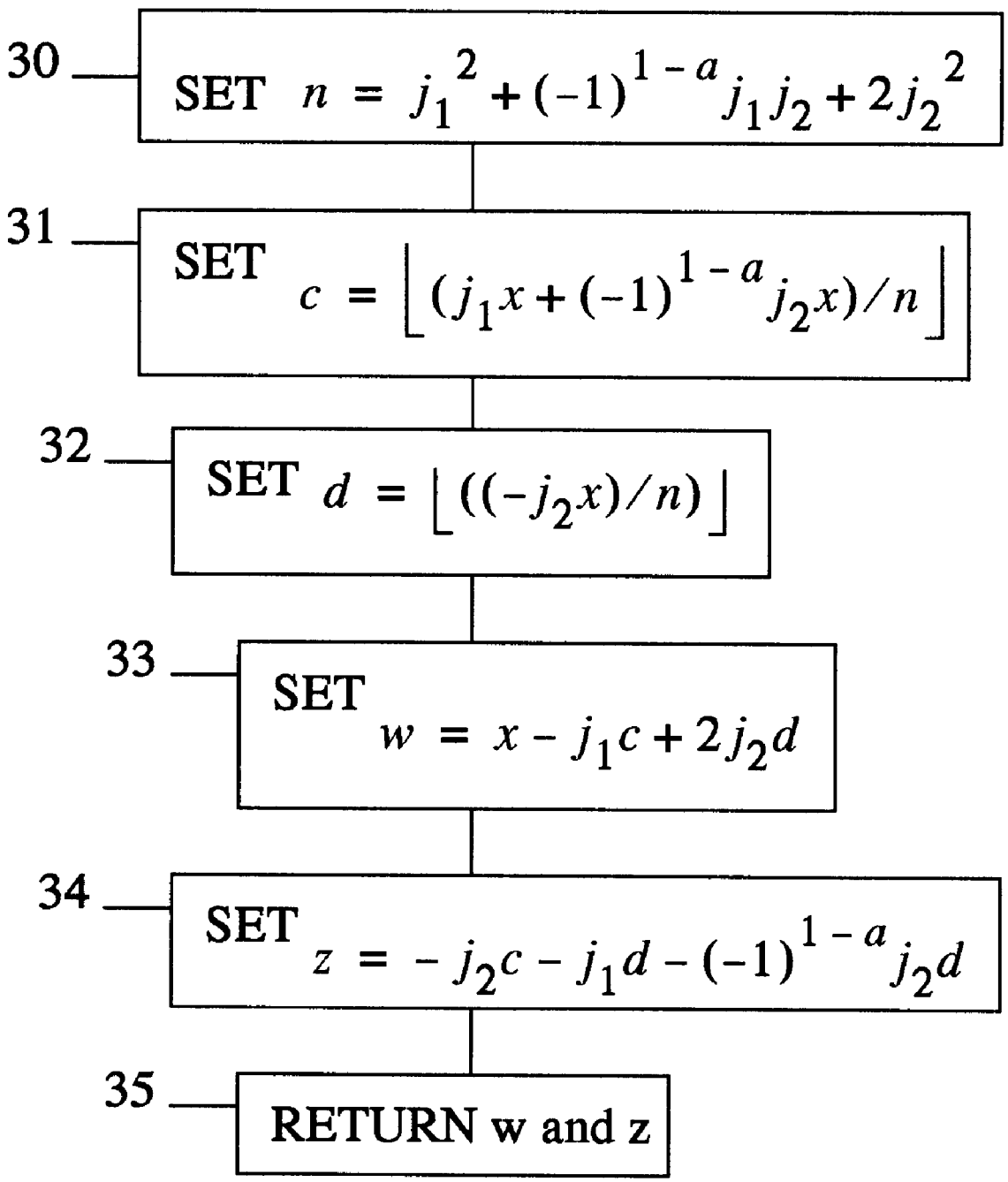
FIG. 3 is a list of steps for reducing a signature key x.

FIG. 3 lists the remaining steps necessary to accomplish the portion of the third step 3 listed in FIG. 1 of reducing x by mod $(\tau^m-1)$, where $(\tau^m-1)=j_1+j_2\tau$.

The first step 30 listed in FIG. 3 is to set $n=(j_1{}^2)+(-1)^{1-a}j_1j_2+2j_2{}^2$, where $j_1$ and $j_2$ resulted from the steps listed in FIG. 2 above, and where "a" is the parameter used to describe the selected elliptic curve.

The second step 31 listed in FIG. 3 is to set $c=\lfloor(j_1x+(-1)^{1-a}j_2x)/n\rfloor$, where "$\lfloor\ \rfloor$" denotes the function that returns the maximum integer not larger than the value contained therein.

The third step 32 listed in FIG. 3 is to set $d=\lfloor-j_2x/n\rfloor$.

The fourth step 33 listed in FIG. 3 is to set $w=x-j_1c+2j_2d$.

The fifth step 34 listed in FIG. 3 is to set $z=j_2c-j_1d-(-1)^{1-a}j_2d$.

The sixth and last step 35 listed in FIG. 3 is to return w and z. Note that $w+z\tau$ represents the modular reduction of the private signature key x (i.e., (x mod $(\tau^m-1)$)).

Figure 4:
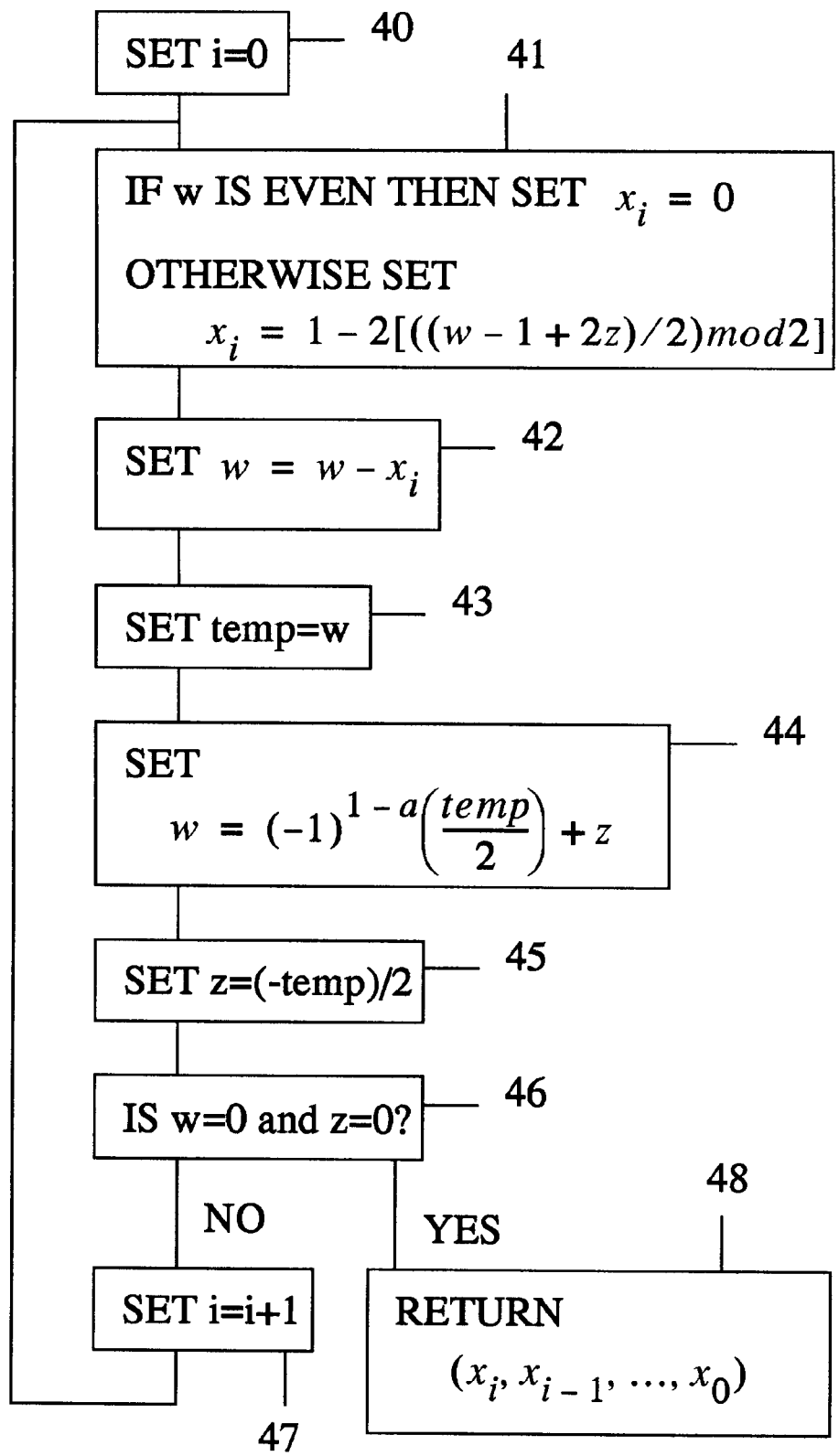
FIG. 4 is a list of steps for representing the reduced signature key of FIG. 3 as a base tau expansion in non-adjacent form.

FIG. 4 lists the steps necessary to accomplish the portion of the third step 3 listed in FIG. 1 of representing the modular reduction of x as a base tau expansion in non-adjacent form.

The first step 40 listed in FIG. 4 is to set a parameter i equal to zero.

The second step 41 listed in FIG. 4 is to determine whether or not w is even. This second step 41 may be returned to as described below. If the second step 41 is returned to, w would have a different value than before as described below. If w is even then set $x_i=0$, where $x_i$ represents the $i^{th}$ bit of the base tau expansion of x in non-adjacent form. If w is not even then set $x_i=1-2[((w-1+2z)/2)\bmod 2]$.

The third step 42 listed in FIG. 4 is to set $w=w-x_i$.

The fourth step 43 listed in FIG. 4 is to set a temporary variable temp equal to w.

The fifth step 44 listed in FIG. 4 is to set $w=(-1)^{1-a}(\text{temp}/2)+z$.

The sixth step 45 listed in FIG. 4 is to set $z=(-\text{temp})/2$.

The seventh step 46 listed in FIG. 4 is to determine whether or not either w or z is not equal to zero.

If either w or z is not equal to zero then the eighth step 47 listed in FIG. 4 is to increment the parameter i by one.

If the parameter i was incremented by one then the next after step 47 is to return to the second step 41 listed in FIG. 4 for further processing.

If both w and z are equal to zero then the last step 48 listed in FIG. 4 is to return the base tau expansion of the modular reduced x in non-adjacent form (i.e. $(x_i,x_{i-1},\ldots,x_0)$).

Figure 5:
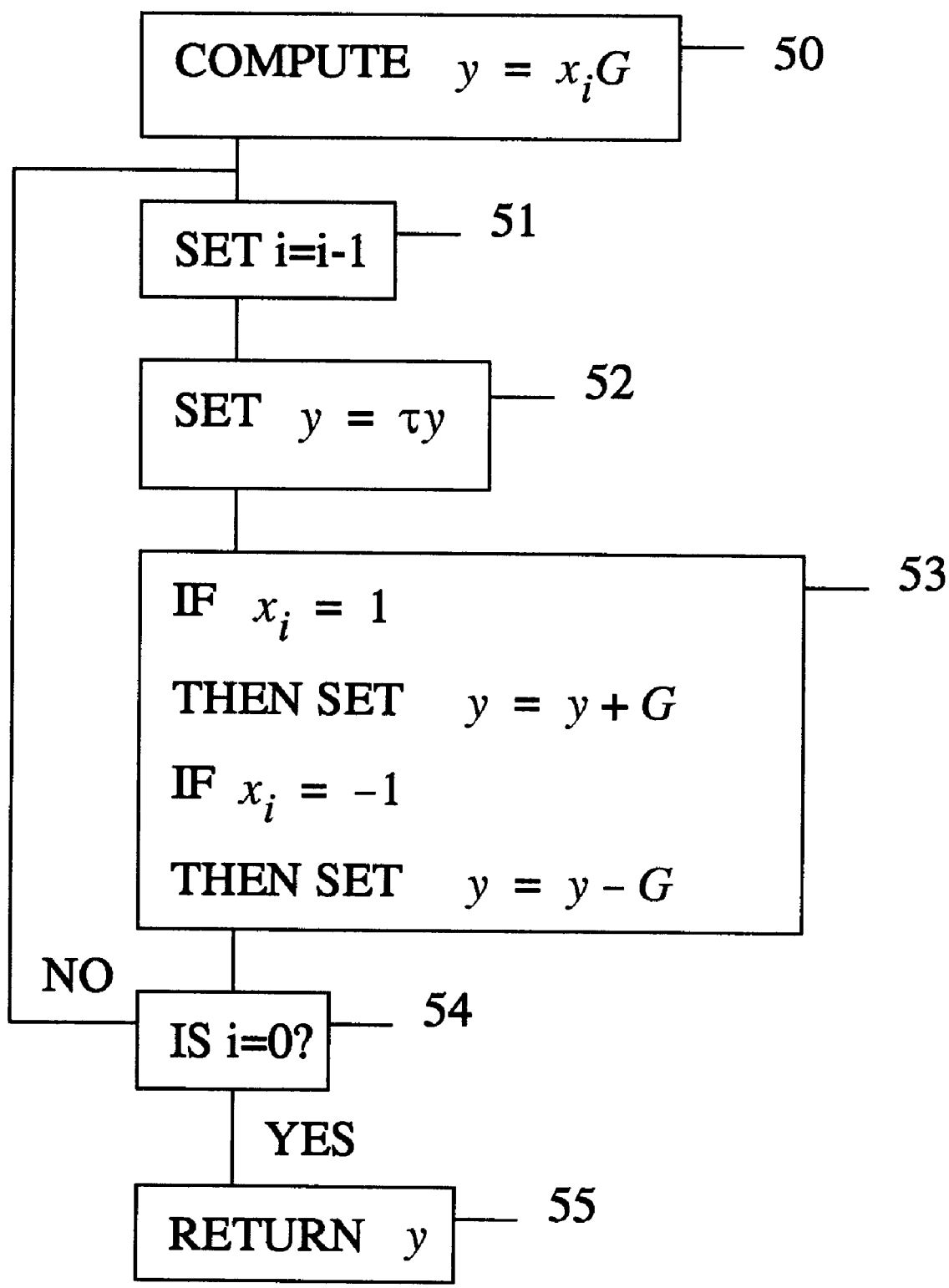
FIG. 5 is a list of steps for multiplying the point G by the reduced signature key represented as a base tau expansion in non-adjacent form to form a point y.

FIG. 5 lists the steps necessary to accomplish the fourth step 4 listed in FIG. 1 of multiplying the point G by the base tau expansion, in non-adjacent form, of the modular reduced x to form a point y on the elliptic curve. The point y is the public signature key that corresponds to the private signature key x.

The first step 50 listed in FIG. 5 is to compute $y=x_iG$, where $x_i$ is the left-most bit of the result of the last step 48 listed in FIG. 4.

The second step 51 listed in FIG. 5 is to decrement the parameter i by one.

The third step 52 listed in FIG. 5 is to set $y=\tau y$. This step may be accomplished by a shift of y.

The fourth step 53 listed in FIG. 5 is to determine if $x_i$ is equal to one or minus one. If $x_1$ is equal to one then set $y=y+G$. If $x_i$ is equal to minus one set $y=y-G$.

The fifth step 54 listed in FIG. 5 is to determine whether or not the parameter i is equal to zero. If the parameter i is equal to zero then the next step is to return to the second step 51 listed in FIG. 5 for further processing. If the parameter i is equal to zero then the next and last step 55 listed in FIG. 5 is to return y.

Figure 6:
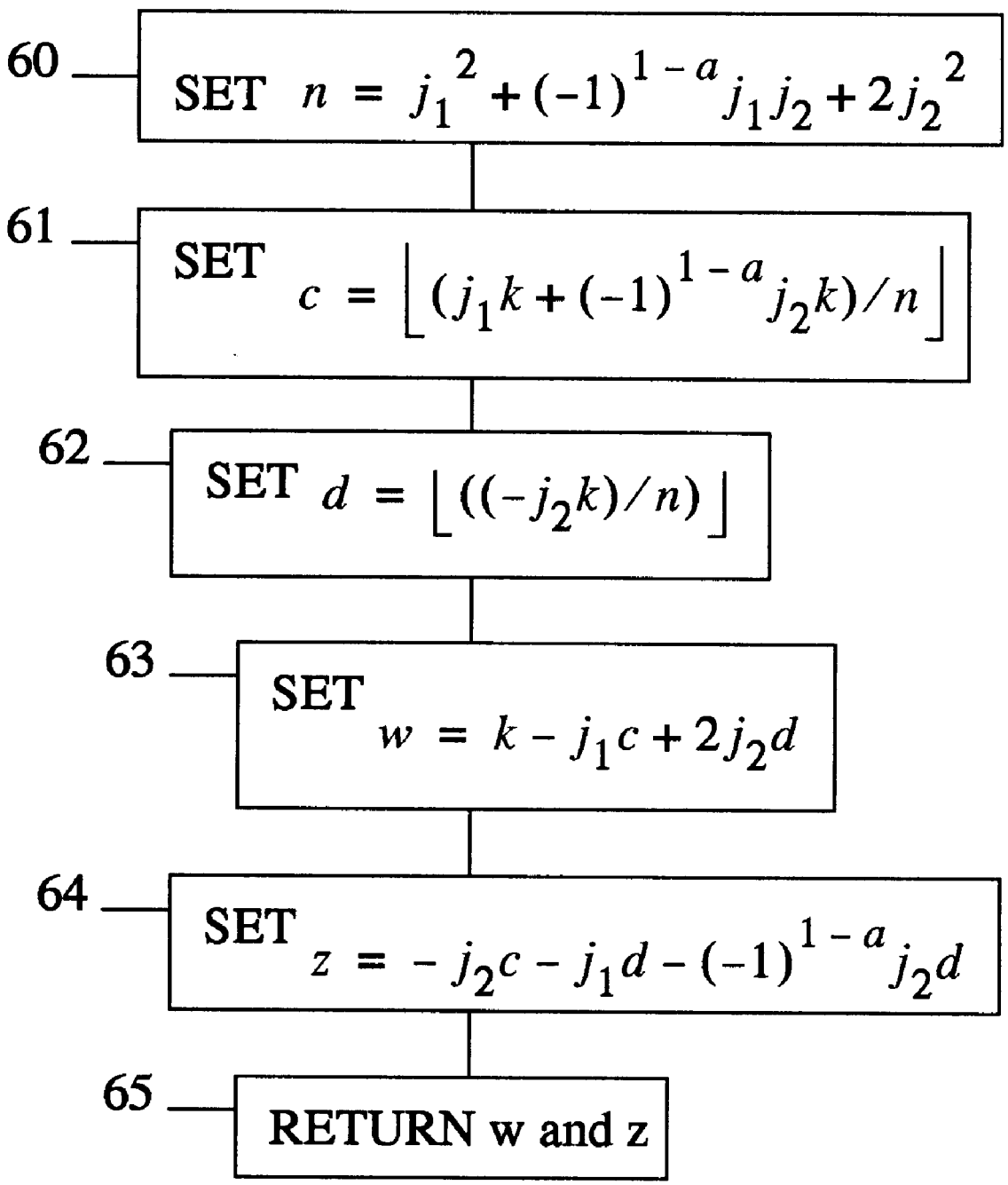
FIG. 6 is a list of steps for reducing a private integer k.

FIG. 6 lists the steps necessary to accomplish the portion of the sixth step 6 listed in FIG. 1 of reducing k by mod $(\tau^m-1)$, where $(\tau^m-1)=j_1+j_2\tau$.

The first step 60 listed in FIG. 6 is to set $n=(j_1{}^2)+(-1)^{1-a}j_1j_2+2j_2{}^2$, where $j_1$ and $j_2$ resulted from the steps listed in FIG. 2 above, and where "a" is one of the parameters used to describe the selected elliptic curve.

The second step 61 listed in FIG. 6 is to set $c=\lfloor(j_1k+(-1)^{1-a}j_2k)/n\rfloor$, where "$\lfloor\ \rfloor$" denotes the function that returns the maximum integer not larger than the value contained therein.

The third step 62 listed in FIG. 6 is to set $d=\lfloor-j_2k/n\rfloor$.

The fourth step 63 listed in FIG. 6 is to set $w=k-j_1c+2j_2d$.

The fifth step 64 listed in FIG. 6 is to set $z=-j_2c-j_1d-(-1)^{1-a}j_2d$.

The sixth and last step 65 listed in FIG. 6 is to return w and z. Note that $w+z\tau$ represents the modular reduction of the private integer k (i.e., (k mod $(\tau^m-1)$)).

Figure 7:
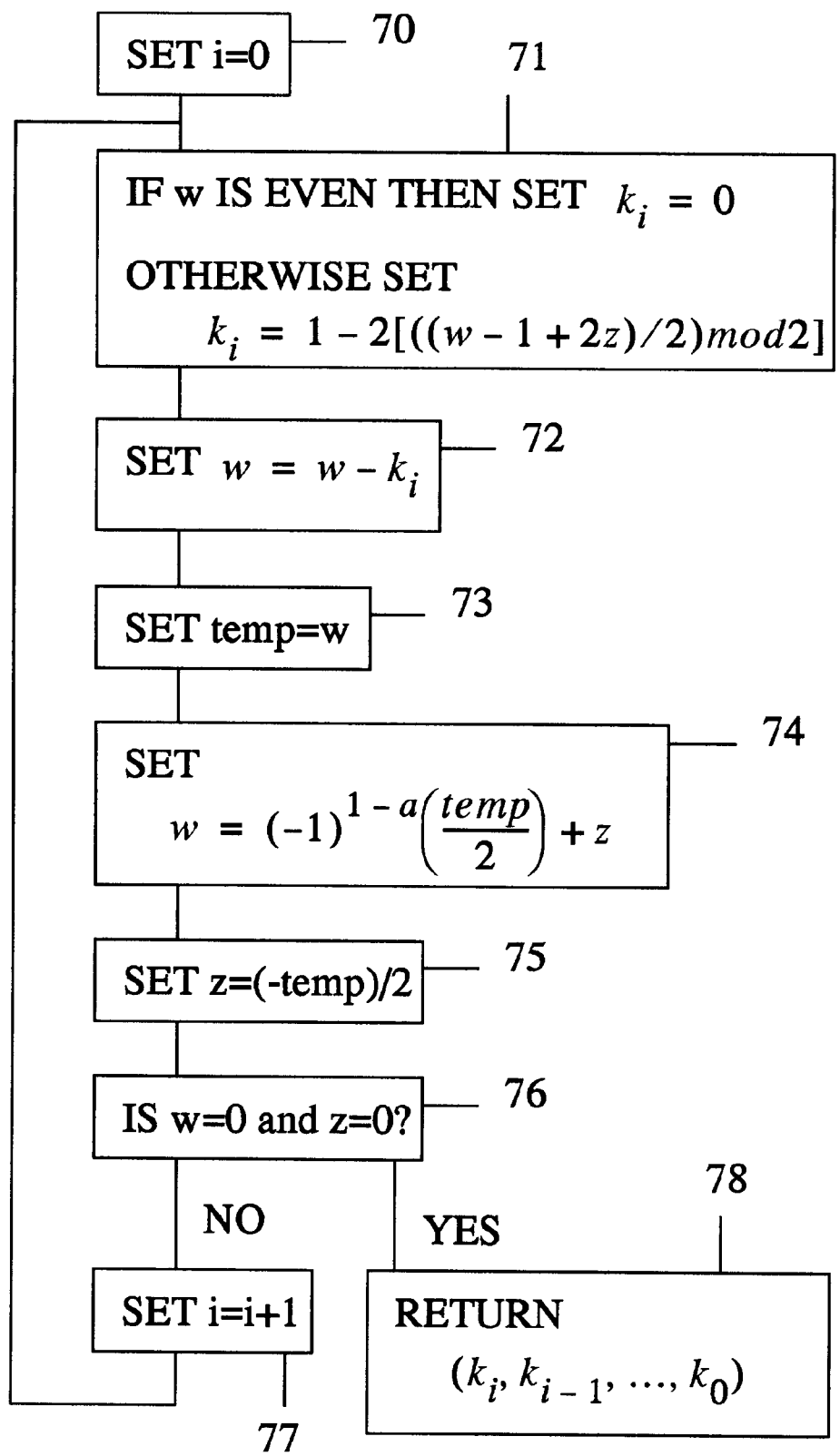
FIG. 7 is a list of steps for representing the reduced private integer of FIG. 6 as a base tau expansion in non-adjacent form.

FIG. 7 lists the steps necessary to accomplish the portion of the sixth step 6 listed in FIG. 1 of representing the modular reduction of k as a base tau expansion in non-adjacent form.

The first step 70 listed in FIG. 7 is to set a parameter i equal to zero.

The second step 71 listed in FIG. 7 is to determine whether or not w is even. This second step 71 may be returned to as described below. If the second step 71 is returned to, w would have a different value than before as described below. If w is even then set $k_i=0$ where $k_i$ represents the $i^{th}$ bit of the base tau expansion of k in non-adjacent form. If w is not even then set $k_i=1-2[((w-1+2z)/2) \mod 2]$.

The third step 72 listed in FIG. 7 is to set $w=w-k_i$.

The fourth step 73 listed in FIG. 7 is to set a temporary variable temp equal to w.

The fifth step 74 listed in FIG. 7 is to set $w=(-1)^{1-a}(\text{temp}/2)+z$.

The sixth step 75 listed in FIG. 7 is to set $z=(-\text{temp})/2$.

The seventh step 76 listed in FIG. 7 is to determine whether or not either w or z is not equal to zero.

If either w or z is not equal to zero then the eighth step 77 listed in FIG. 7 is to increment the parameter i by one.

If the parameter i was incremented by one then the next after step 77 is to return to the second step 71 listed in FIG. 7 for further processing.

If both w and z are equal to zero then the last step 78 listed in FIG. 7 is to return the base tau expansion of the modular reduced k in non-adjacent form (i.e., $(k_i, k_{i-1}, \ldots, k_0)$).

Figure 8:
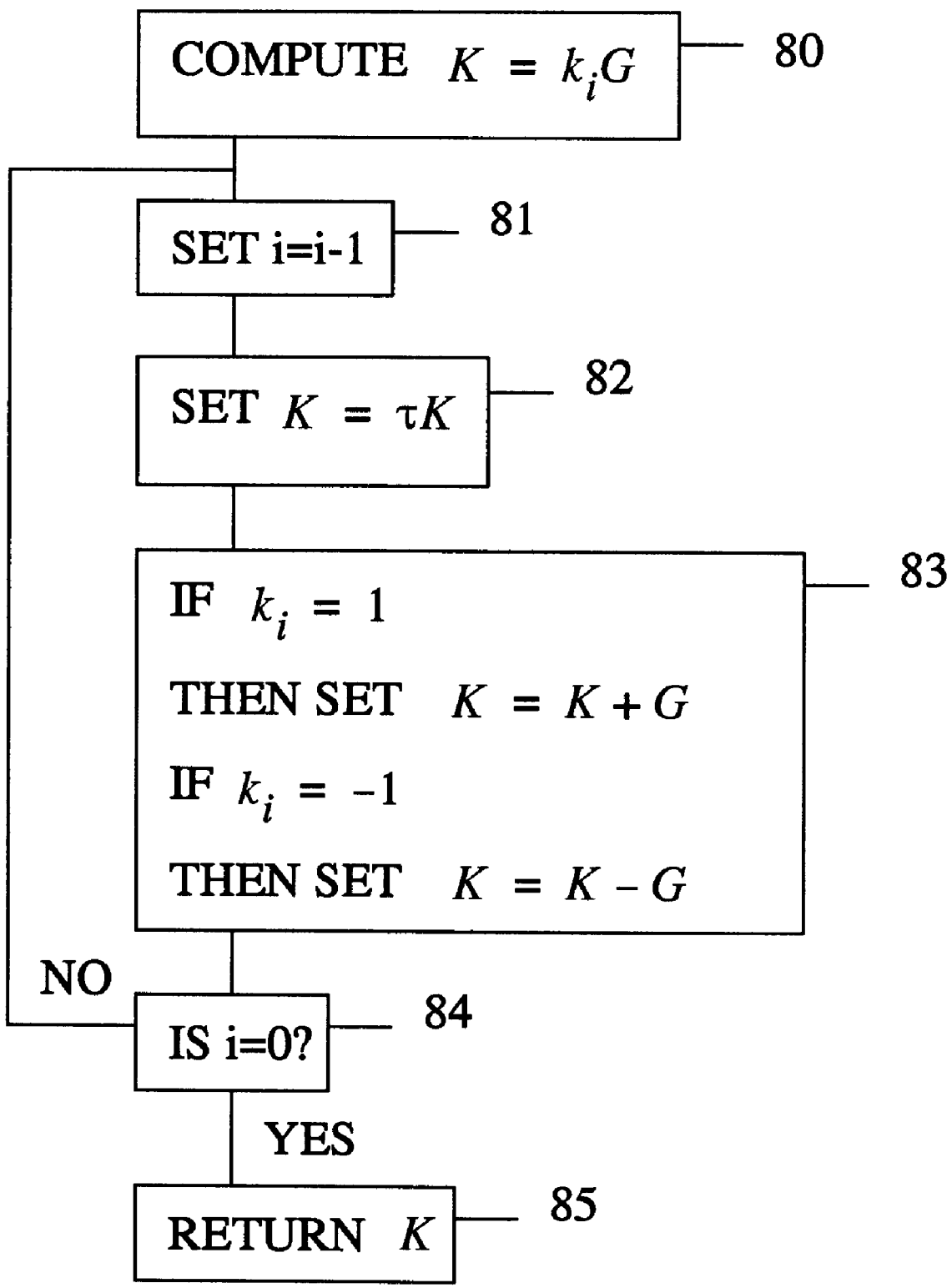
FIG. 8 is a list of steps for multiplying the point G by the reduced private integer of FIG. 6 represented as a base tau expansion in non-adjacent form to form a point K.

FIG. 8 lists the steps necessary to accomplish the seventh step 7 listed in FIG. 1 of multiplying the point G by the base tau expansion, in non-adjacent form, of the modular reduced k to form a point K on the elliptic curve, where $K=(K_x, K_y)$ The first step 80 listed in FIG. 8 is to compute $K=k_iG$, where $k_i$ is the left-most bit of the result of the last step 78 listed in FIG. 7.

The second step 81 listed in FIG. 8 is to decrement the parameter i by one.

The third step 82 listed in FIG. 8 is to set $K=\tau K$. This step may be accomplished by a shift of K.

The fourth step 83 listed in FIG. 8 is to determine if $k_i$ is equal to one or minus one. If $k_i$ is equal to one then set $K=K+G$. If $k_i$ is equal to minus one set $K=K-G$.

The fifth step 84 listed in FIG. 8 is to determine whether or not the parameter i is equal to zero. If the parameter i is equal to zero then the next step is to return to the second step 81 listed in FIG. 8 for further processing. If the parameter i is equal to zero then the next and last step 85 listed in FIG. 8 is to return K.

Figure 9:
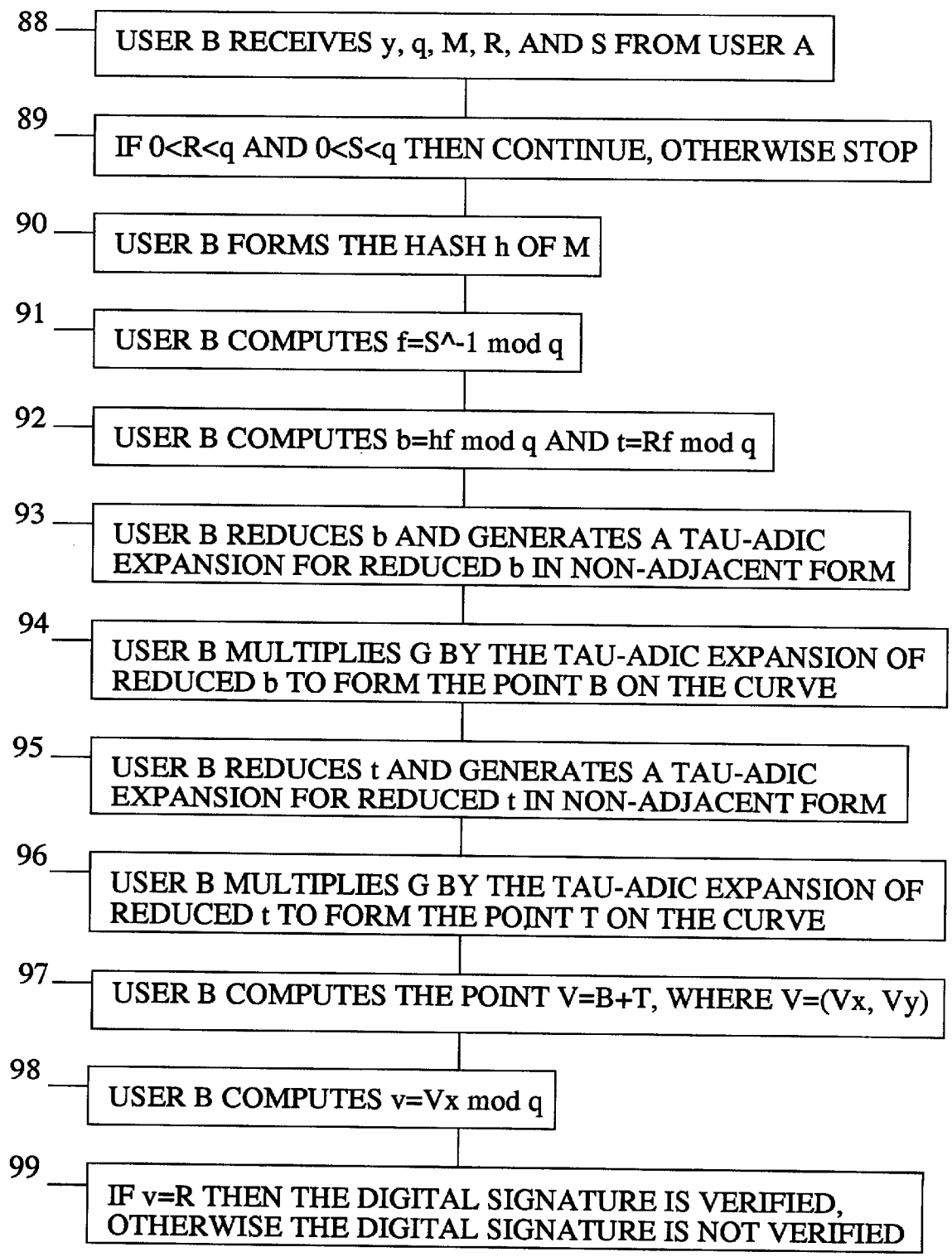
FIG. 9 is a list of steps for verifying a digital signature generated in accordance with the present invention.

FIG. 9 lists the step that User B must perform in order to verify a digital signature transmitted to User B by User A.

The first step 88 listed in FIG. 9 for verifying a digital signature is for User B to receive parameters y, q, M, R, and S from a sender (presumably User A, but that is yet to be verified), where y is the public signature key of the sender, where q is the order of the base point G on the elliptic curve selected, where M is a message, and where the pair (R,S) is the digital signature of the message M.

The second step 89 listed in FIG. 9 for verifying a digital signature is for User B to determine whether or not $0<R<q$ and whether or not $0<S<q$. If both expressions are true then User B proceeds to the third step 90 for further processing. If either expression is false then processing is stopped and the digital signature is deemed not verified.

The third step 90 listed in FIG. 9 for verifying a digital signature is for User B to form the hash of the message M received using the identical hash function that the sender used to generate S. Note that User A must somehow communicate to User B which hash function User A is using.

The fourth step 91 listed in FIG. 9 for verifying a digital signature is for User B to compute $f=((S^\wedge-1) \mod q)$.

The fifth step 92 listed in FIG. 9 for verifying a digital signature is for User B to compute $b=(hf \mod q)$ and $t=(Rf \mod q)$.

The sixth step 93 listed in FIG. 9 for verifying a digital signature is for User B to reduce b computed in the fifth step 92 listed in FIG. 9 by modulo $(\tau^m-1)$, where $\tau=((-1)^a+((-7)^{\wedge}0.5))/2$ and generating a base tau expansion of the reduced b in non-adjacent form. The exact steps for generating (b mod $(\tau^m-1)$) and generating a base tau expansion of (b mod $(\tau^m-1)$) are described below and are listed in FIG. 10 and FIG. 11.

The seventh step 94 listed in FIG. 9 for verifying a digital signature is for User B to multiply the base point G by the base tau expansion, in non-adjacent form, of the reduced b to form a point B on the elliptic curve. The exact details of the multiplication are described below and are listed in FIG. 12.

The eighth step 95 listed in FIG. 9 for verifying a digital signature is for User B to reduce t computed in the fifth step 92 listed in FIG. 9 by modulo $(\tau^m-1)$, where $\tau=((-1)^a+((-7)^{\wedge}0.5))/2$ and generating a base tau expansion of the reduced t in non-adjacent form. The exact steps for generating (t mod $(\tau^m-1)$) and generating a tau-adic expansion of (t mod $(\tau^m-1)$) are described below and are listed in FIG. 13 and FIG. 14.

The ninth step 96 listed in FIG. 9 for verifying a digital signature is for User B to multiply the base point G by the base tau expansion, in non-adjacent form, of the reduced t to form a point T on the elliptic curve. The exact details of the multiplication are described below and are listed in FIG. 15.

The tenth step 97 listed in FIG. 9 for verifying a digital signature is for User B to compute the point $V=B+T$ on the elliptic curve, where $V=(V_x, V_y)$.

The eleventh step 98 listed in FIG. 9 for verifying a digital signature is for User B to compute $v=(V_x \mod q)$, where $V_x$ is the x-coordinate of the point V.

The twelfth and last step 99 listed in FIG. 9 for verifying a digital signature is for User B to determine whether or not $v=R$. If $v=R$ then the digital signature is verified. Otherwise, the digital signature is not verified.

Figure 10:
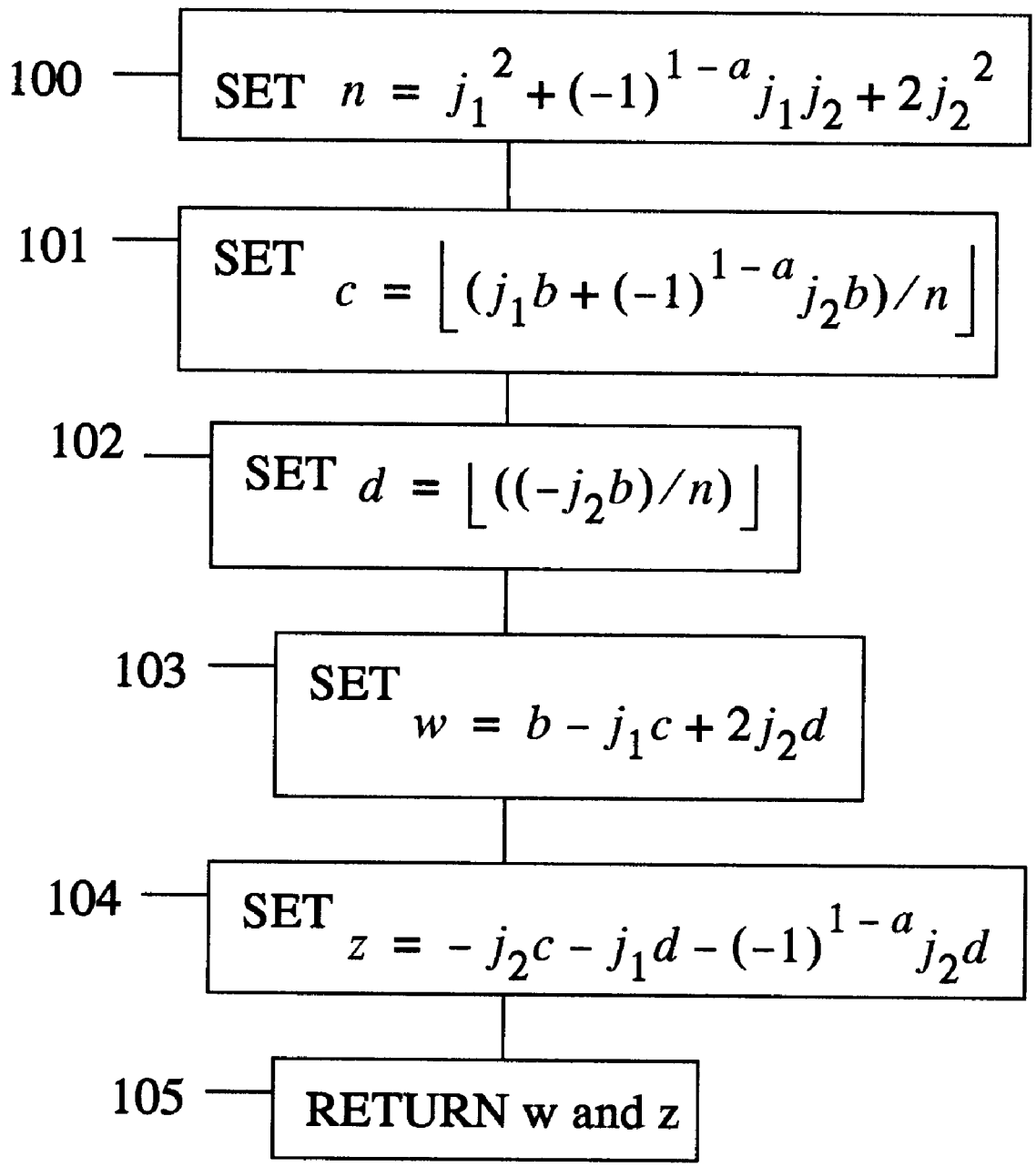
FIG. 10 is a list of steps for reducing an integer b.

FIG. 10 lists the steps necessary to accomplish the portion of the sixth step 93 listed in FIG. 9 of reducing b by mod $(\tau^m-1)$, where $(\tau^m-1)=j_1+j_2\tau$.

The first step 100 listed in FIG. 10 is to set $n=(j_1{}^\wedge 2)+(-1)^{1-a}j_1j_2+2j_2{}^\wedge 2$, where $j_1$ and $j_2$ resulted from the steps listed in FIG. 2 above, and where "a" is one of the parameters used to describe the selected elliptic curve.

The second step 101 listed in FIG. 10 is to set $c=\lfloor(j_1b+(-1)^{1-a}j_2b)/n\rfloor$, where "$\lfloor\ \rfloor$" denotes the function that returns the maximum integer not larger than the value contained therein.

The third step 102 listed in FIG. 10 is to set $d=\lfloor -j_2b/n\rfloor$.

The fourth step 103 listed in FIG. 10 is to set $w=b-j_1c+2j_2d$.

The fifth step 104 listed in FIG. 10 is to set $z=-j_2c-j_1d-(-1)^{1-a}j_2d$.

The sixth and last step 105 listed in FIG. 10 is to return w and z. Note that $w+z\tau$ represents the modular reduction of k (i.e., (b mod $(\tau^m-1)$)).

Figure 11:
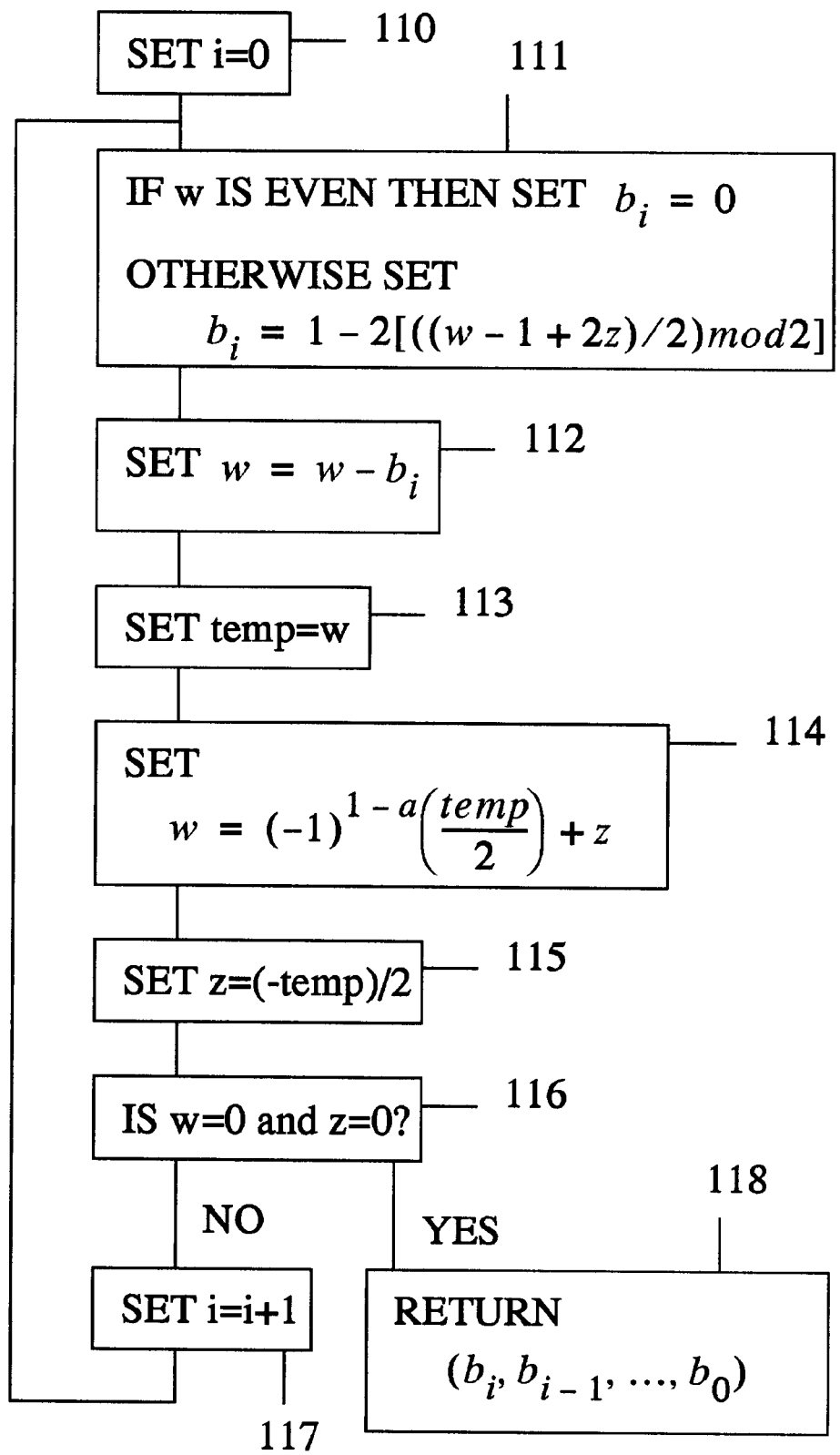
FIG. 11 is a list of the steps for representing the reduced integer of FIG. 10 as a base tau expansion in non-adjacent form.

FIG. 11 lists the steps necessary to accomplish the portion of the sixth step 93 listed in FIG. 9 of representing the modular reduction of b as a base tau expansion in non-adjacent form.

The first step 110 listed in FIG. 11 is to set a parameter i equal to zero.

The second step 111 listed in FIG. 11 is to determine whether or not w is even. This second step 111 may be returned to as described below. If the second step 111 is returned to then w would have a different value than before as described below. If w is even then set $b_i=0$, where $b_i$ represents the $i^{th}$ bit of the base tau expansion of b in non-adjacent form. If w is not even then set $b_i=1-2[((w-1+2z)/2)\bmod 2]$.

The third step 112 listed in FIG. 11 is to set $w=w-b_i$.

The fourth step 113 listed in FIG. 11 is to set a temporary variable temp equal to w.

The fifth step 114 listed in FIG. 11 is to set $w=(-1)^{1-a}(\text{temp}/2)+z$.

The sixth step 115 listed in FIG. 11 is to set $z=(-\text{temp})/2$.

The seventh step 116 listed in FIG. 11 is to determine whether or not either w or z is not equal to zero.

If either w or z is not equal to zero then the eighth step 117 listed in FIG. 7 is to increment the parameter i by one.

If the parameter i was incremented by one then the next step after step 117 is to return to the second step 111 listed in FIG. 11 for further processing.

If both w and z are equal to zero then the last step 118 listed in FIG. 11 is to return the base tau expansion of the modular reduced b in non-adjacent form (i.e., $(b_i, b_{i-1}, \ldots, b_0)$).

Figure 12:
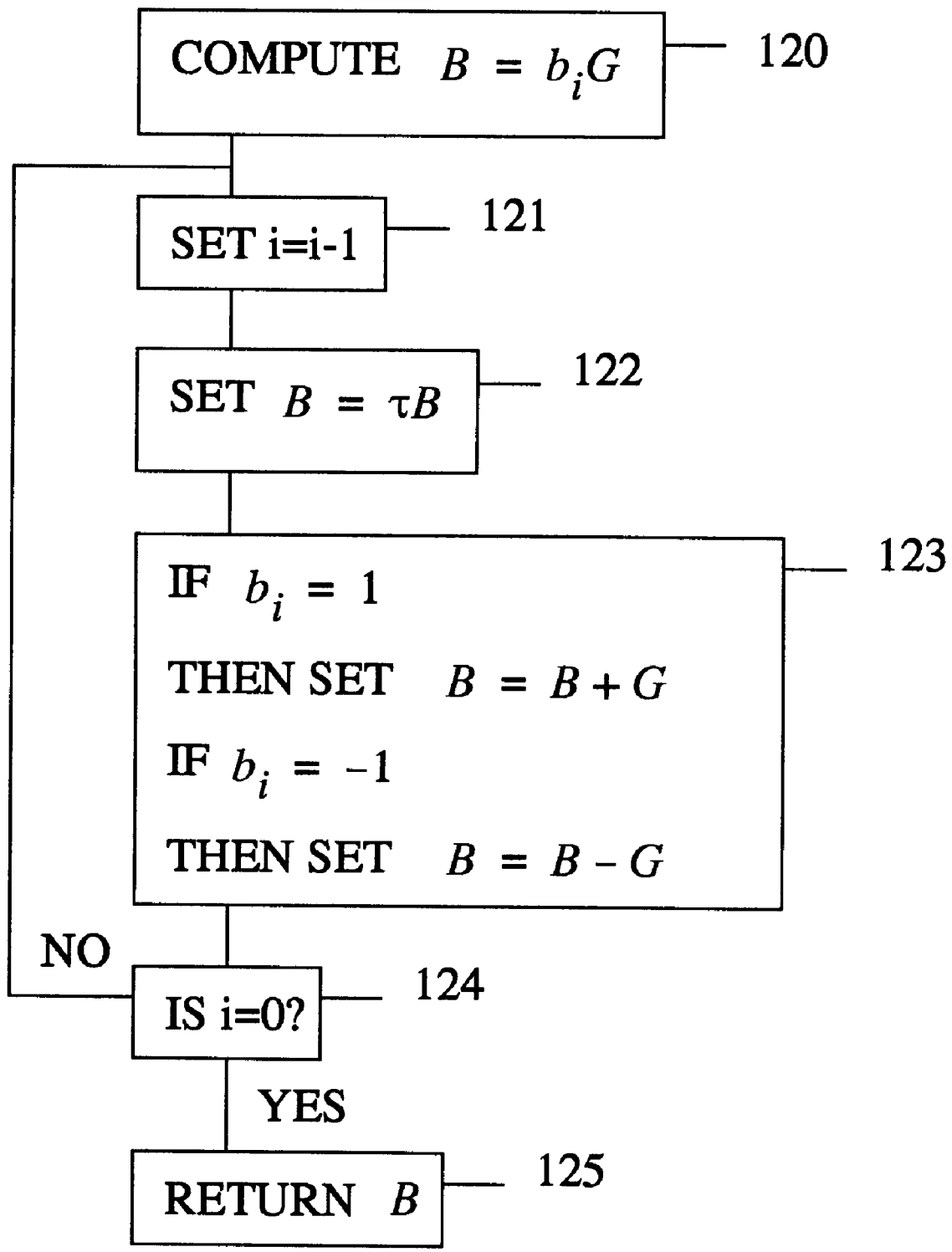
FIG. 12 is a list of steps for multiplying the point G by the reduced integer of FIG. 10 represented as a base tau expansion in non-adjacent form to form a point B.

FIG. 12 lists the steps necessary to accomplish the seventh step 94 listed in FIG. 9 of multiplying the point G by the base tau expansion, in non-adjacent form, of the modular reduced b to form a point B on the elliptic curve, where $B=(B_x, B_y)$.

The first step 120 listed in FIG. 12 is to compute $B=b_iG$, where $b_i$ is the left-most bit of the result of the last step 118 listed in FIG. 11.

The second step 121 listed in FIG. 12 is to decrement the parameter i by one.

The third step 122 listed in FIG. 12 is to set $B=\tau B$. This step may be accomplished by a shift of B.

The fourth step 123 listed in FIG. 12 is to determine if $b_i$ is equal to one or minus one. If $b_i$ is equal to one then set $B=B+G$. If $b_i$ is equal to minus one set $B=B-G$.

The fifth step 124 listed in FIG. 12 is to determine whether or not the parameter i is equal to zero. If the parameter i is equal to zero then the next step is to return to the second step 121 listed in FIG. 12 for further processing. If the parameter i is equal to zero then the next and last step 125 listed in FIG. 12 is to return B.

Figure 13:
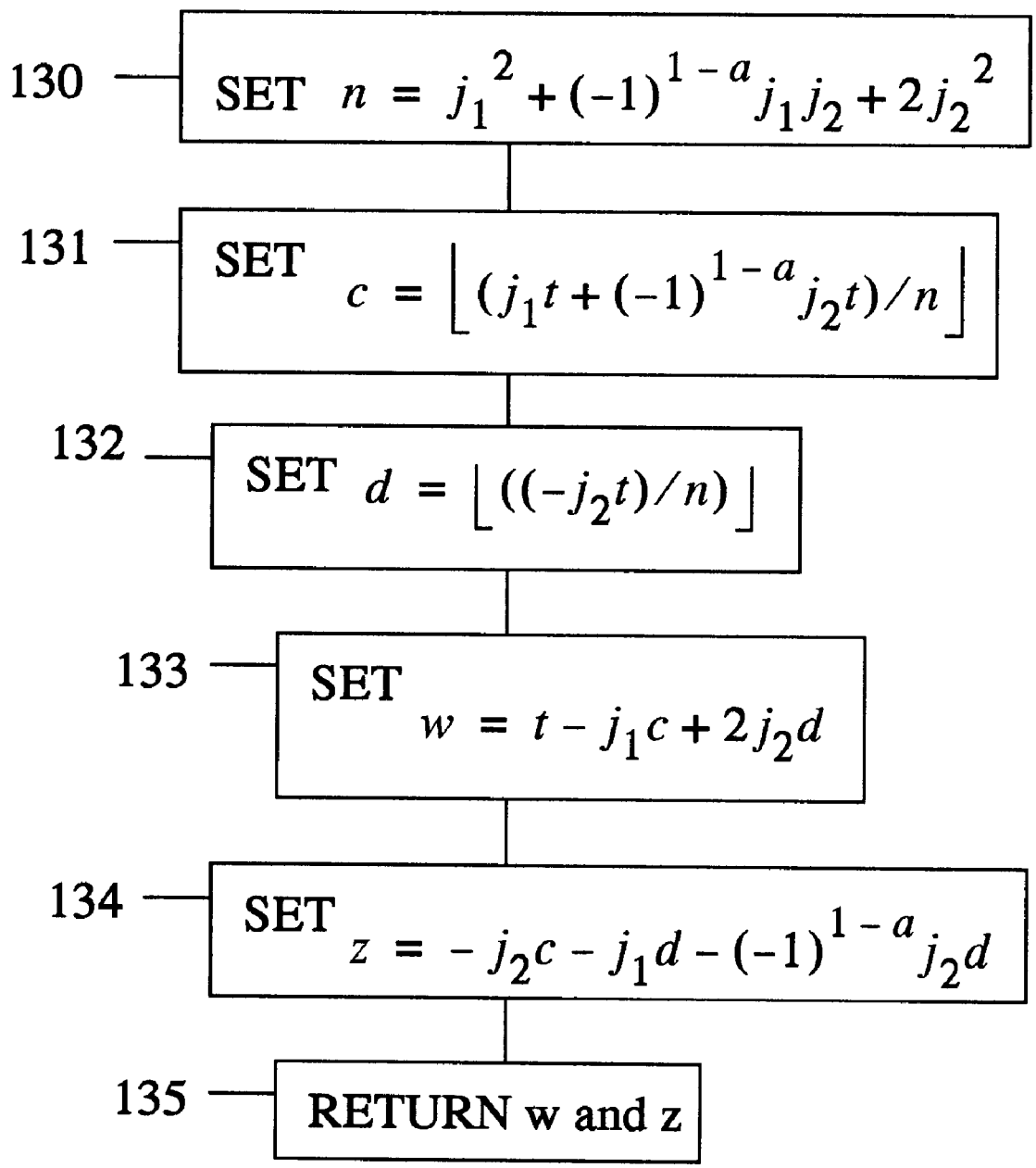
FIG. 13 is a list of steps for reducing an integer t.

FIG. 13 lists the steps necessary to accomplish the portion of the eighth step 95 listed in FIG. 9 of reducing t by mod $(\tau^m-1)$, where $(\tau^m-1)=j_1+j_2\tau$.

The first step 130 listed in FIG. 13 is to set $n=(j_1{}^2)+(-1)^{1-a}j_1j_2+2j_2{}^2$, where $j_1$ and $j_2$ resulted from the steps listed in FIG. 2 above, and where "a" is one of the parameters used to describe the selected elliptic curve.

The second step 131 listed in FIG. 13 is to set $c=\lfloor(j_1t+(-1)^{1-a}j_2z)/n\rfloor$, where "$\lfloor\ \rfloor$" denotes the function that returns the maximum integer not larger than the value contained therein.

The third step 132 listed in FIG. 13 is to set $d=\lfloor-j_2t/n\rfloor$.

The fourth step 133 listed in FIG. 13 is to set $w=t-j_1c+2j_2d$.

The fifth step 134 listed in FIG. 13 is to set $z=-j_2c-j_1d-(-1)^{1-a}j_2d$.

The sixth and last step 135 listed in FIG. 13 is to return w and z. Note that $w+z\tau$ represents the modular reduction of t (i.e., (t mod $(\tau^m-1)$)).

Figure 14:
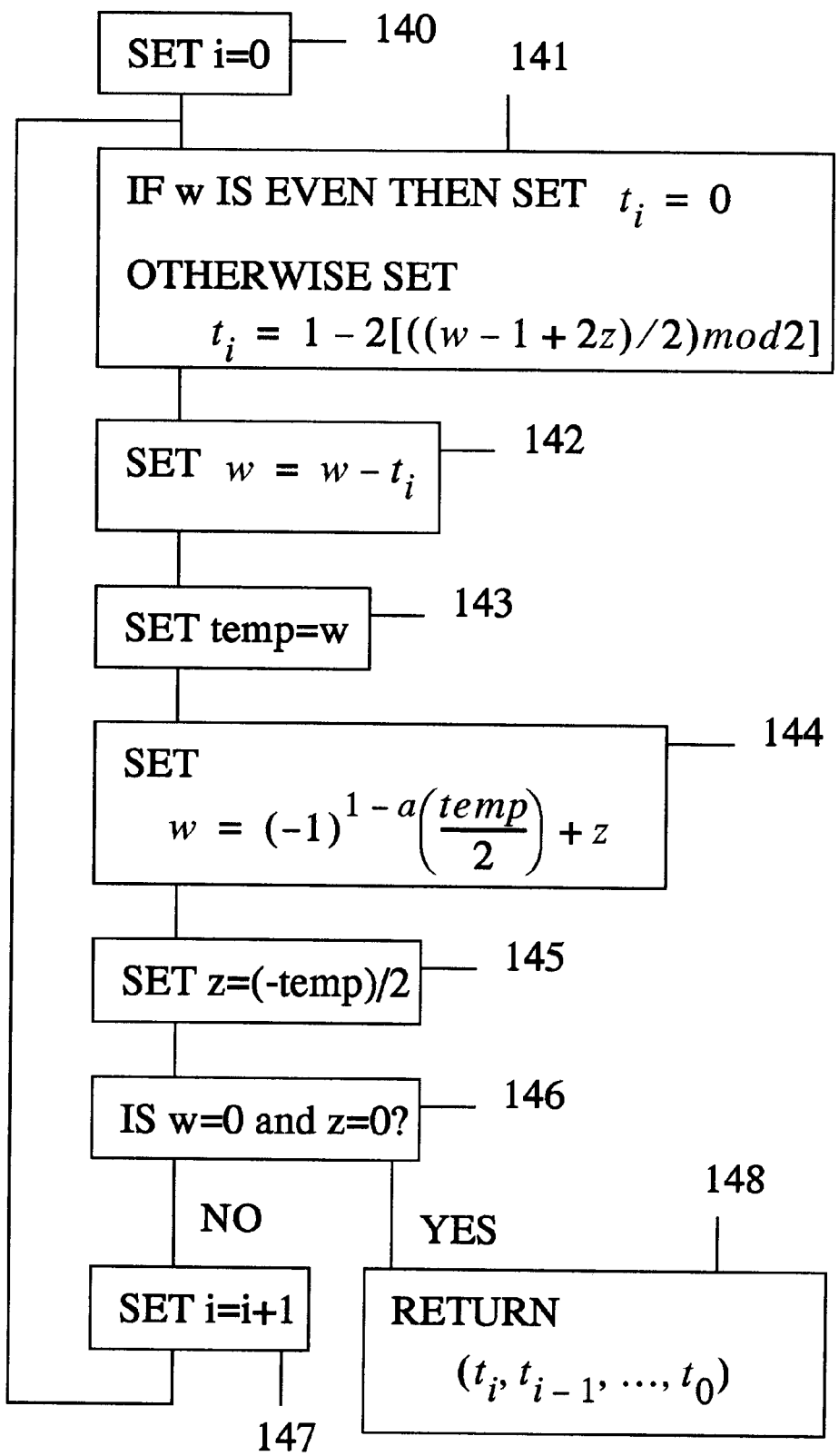
FIG. 14 is a list of steps for representing the reduced integer of FIG. 13 as a base tau expansion in non-adjacent form.

FIG. 14 lists the steps necessary to accomplish the portion of the eighth step 95 listed in FIG. 9 of representing the modular reduction of t as a base tau expansion in non-adjacent form.

The first step 140 listed in FIG. 14 is to set a parameter i equal to zero.

The second step 141 listed in FIG. 14 is to determine whether or not w is even. This second step 141 may be returned to as described below. If the second step 141 is returned to then w would have a different value than before as described below. If w is even then set $t_i=0$, where $t_i$ represents the $i^{th}$ bit of the base tau expansion of t in non-adjacent form. If w is not even then set $t_i=1-2[((w-1+2z)/2)\bmod 2]$.

The third step 142 listed in FIG. 14 is to set $w=w-t_i$.

The fourth step 143 listed in FIG. 14 is to set a temporary variable temp equal to w.

The fifth step 144 listed in FIG. 14 is to set $w=(-1)^{1-a}(\text{temp}/2)+z$.

The sixth step 145 listed in FIG. 14 is to set $z=(-\text{temp})/2$.

The seventh step 146 listed in FIG. 14 is to determine whether or not either w or z is not equal to zero.

If either w or z is not equal to zero then the eighth step 147 listed in FIG. 14 is to increment the parameter i by one.

If the parameter i was incremented by one then the next step after step 147 is to return to the second step 141 listed in FIG. 14 for further processing.

If both w and z are equal to zero then the last step 148 listed in FIG. 14 is to return the base tau expansion of the modular reduced t in non-adjacent form (i.e., $(t_1, t_{i-1}, \ldots, t_0)$).

Figure 15:
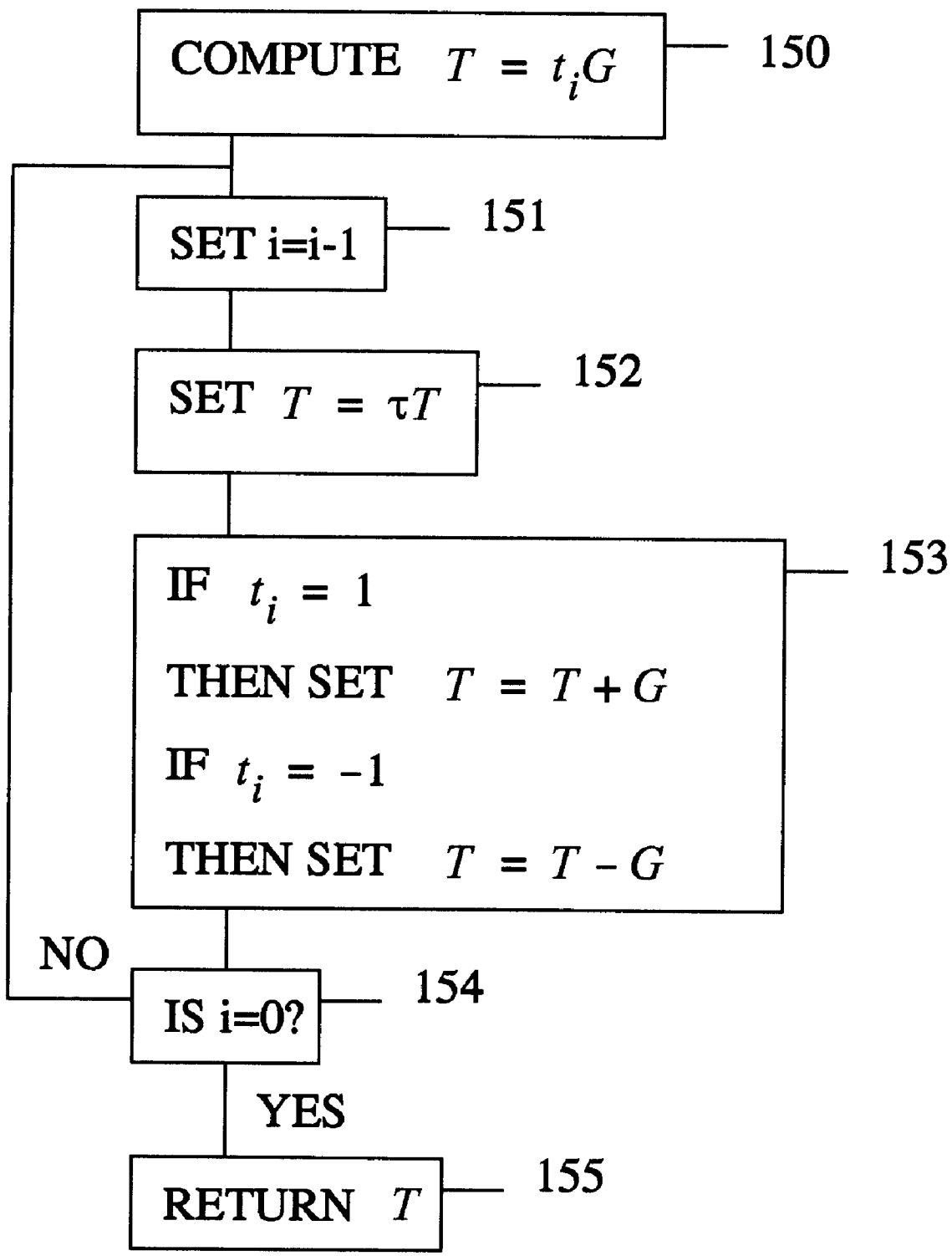
FIG. 15 is a list of steps for multiplying the point y by the reduced integer of FIG. 13 represented as a base tau expansion in non-adjacent form to form a point T.

FIG. 15 lists the steps necessary to accomplish the ninth step 96 listed in FIG. 9 of multiplying the point G by the base tau expansion, in non-adjacent form, of the modular reduced t to form a point T on the elliptic curve, where $T=(T_x, T_y)$.

The first step 150 listed in FIG. 15 is to compute $T=t_iG$, where $t_i$ is the left-most bit of the result of the last step 148 listed in FIG. 14.

The second step 151 listed in FIG. 15 is to decrement the parameter i by one.

The third step 152 listed in FIG. 15 is to set $T=\tau T$. This step may be accomplished by a shift of T.

The fourth step 153 listed in FIG. 15 is to determine if $t_i$ is equal to one or minus one. If $t_i$ is equal to one then set $T=T+G$. If $t_i$ is equal to minus one set $T=T-G$.

The fifth step 154 listed in FIG. 15 is to determine whether or not the parameter i is equal to zero. If the parameter i is equal to zero then the next step is to return to the second step 151 listed in FIG. 15 for further processing. If the parameter i is equal to zero then the next and last step 155 listed in FIG. 15 is to return T.

What is claimed is:

1. A method of generating a digital signature for transmission to a recipient, comprising the steps of:

a) selecting an elliptic curve, where the elliptic curve is of the form $y^2+xy=x^3+a(x^2)+1$, where "a" is a member of a field $F_2$, where the elliptic curve is defined over a field $F_2m$, and where m is an integer;

b) selecting a point G on the elliptic curve as a base point, where the point G is of order q, and where q is an integer;

c) generating a private signature key x and a message M;

d) reducing x by mod $(\tau^m-1)$ in the form of $w+zt$;

e) generating a base tau expansion, in non-adjacent form, of the result of step (d);

f) multiplying G by the result of step (e) to form a point y on the elliptic curve;

g) computing $h=\text{Hash}(M)$, where "Hash" is a secure one-way hash function;

h) generating a private integer k;

i) reducing k by mod ($\tau^m-1$) in the form of w+zt;

j) generating a base tau expansion, in non-adjacent form, of the result of step (i);

k) multiplying G by the result of step (j) to form a point K on the elliptic curve, where K=($K_x$,$K_y$);

l) computing R=($K_x$ mod q);

m) returning to step (h) if R=0, otherwise proceeding to the next step;

n) computing S=(k^-1)(h+xR);

o) returning to step (h) if S=0, otherwise proceeding to the next step; and p) transmitting y, q, M, R, and S to the recipient, where the pair (R,S) is the digital signature for the message M.

2. The method of claim 1, wherein said step of reducing x by mod ($\tau^m-1$) in the form of w+z$\tau$ is comprised of the steps of:

a) setting $L_0$=0;

b) setting $L_1$=1;

c) setting i=2;

d) setting $L_i$=$(-1)^{1-a}L_{i-1}-2L_{i-2}$;

e) determining whether or not i=m;

f) incrementing i by one and returning to step (d) for further processing if i≠m in step (e); and g) setting $j_1$=$-2L_{i-1}-1$, setting $j_2$=$L_i$, and returning $j_1$ and $j_2$ if i=m in step (e).

3. The method of claim 2, further comprising the steps of:

a) setting n=($j_1$^2)+$(-1)^{1-a}j_1 j_2$+2($j_2$^2);

b) setting c=$\lfloor (j_1 x+(-1)^{1-a}j_2 x)/n \rfloor$, where "$\lfloor$ $\rfloor$" denotes a function of returning the largest integer not larger than the value contained therein;

c) setting d=$\lfloor -j_2 x/n \rfloor$;

d) setting w=x-$j_1$c+2$j_2$d;

e) setting z=$-j_2 c-j_1 d-(-1)^{1-a}j_2 d$; and f) returning, w and z.

4. The method of claim 1, wherein said step of generating a base tau expansion, in non-adjacent form, of the result of step (d) is comprised of the steps of:

a) setting i=0;

b) setting $x_i$=0 if w is even, otherwise setting $x_i$=1-z[((w-1+2z)/2) mod 2];

c) setting w=w-$x_i$;

d) setting temp=w;

e) setting $(-1)^{1-a}$(temp/2)+z;

f) setting z=(-temp)/2; and g) incrementing i by one and returning to step (b) if both w and z are not equal to zero, otherwise returning ($x_i$, $x_{i-1}$, . . . ,$x_0$) as the base tau expansion, in non-adjacent form, of the modular reduced private signature key x.

5. The method of claim 1, wherein said step of multiplying G by the result of step (e) is comprised of the steps of:

a) computing y=$x_i$G;

b) decrementing i by one;

c) setting y=ty;

d) setting y=y+G if $x_i$=1;

e) setting y=y-G if $x_i$=-1; and f) returning to step (b) for further processing if i=0, otherwise returning y as the product of G and the base tau expansion, in non-adjacent form, of the modular reduced private signature key x.

6. The method of claim 1, wherein said step of reducing k by mod ($\tau^m-1$) in the form of w+z$\tau$ comprised of the steps of:

a) setting $L_0$=0;

b) setting $L_1$=1;

c) setting i=2;

d) setting $L_i$=$(-1)^{1-a}L_{i-1}-2L_{i-2}$;

e) determining whether or not i=m;

f) incrementing i by one and returning to step (d) for further processing if i≠m in step (e); and g) setting $j_1$=$-2L_{i-1}-1$, setting $j_2$=$L_i$, and returning $j_1$ and $j_2$ if i=m in step (e).

7. The method of claim 6, further comprising the steps of:

a) setting n=($j_1$^2)+$(-1)^{1-a}j_1 j_2$+2($j_2$^2);

b) setting c=$\lfloor (j_1 x+(-1)^{1-a}j_2 x)/n \rfloor$, where "$\lfloor$ $\rfloor$" denotes a function of returning the largest integer not larger than the value contained therein;

c) setting d=$\lfloor -j_2 x/n \rfloor$;

d) setting w=x-$j_1$c+2$j_2$d;

e) setting z=$-j_2 c-j_1 d-(-1)^{1-a}j_2 d$; and f) returning w and z.

8. The method of claim 1, wherein said step of generating a base tau expansion, in non-adjacent form, of the result of step (i) is comprised of the steps of:

a) setting i=0;

b) setting $k_i$=0 if w is even, otherwise setting $k_i$=1-z[((w-1+2z)/2) mod 2];

c) setting w=w-$k_i$;

d) setting temp=w;

e) setting w=$(-1)^{1-a}$(temp/2)+z;

f) setting z=(-temp)/2; and g) incrementing i by one and returning to step (b) if both w and z are not equal to zero, otherwise returning ($k_i$, $k_{i-1}$, . . . ,$k_0$) as the base tau expansion, in non-adjacent form, of the modular reduced private integer k.

9. The method of claim 1, wherein said step of multiplying G by the result of step (j) is comprised of the steps of:

a) computing K=$k_i$G;

b) decrementing i by one;

c) setting K=tK;

d) setting K=K+G if $k_i$=1;

e) setting K=K-G if $k_i$=-1; and f) returning to step (b) for further processing if i=0, otherwise returning K as the product of G and the base tau expansion, in non-adjacent form, of the modular reduced private integer k.

10. The method of claim 3, wherein said step of generating a base tau expansion in non-adjacent form, of the result of step (d) is comprised of the steps of:

a) setting i=0;

b) setting $x_i$=0 if w is even, otherwise setting $x_i$=1-z[((w-1+2z)/2) mod 2];

c) setting w=w-$x_i$;

d) setting temp=w;

e) setting w=$(-1)^{1-a}$(temp/2)+z;

f) setting z=(-temp)/2; and g) incrementing i by one and returning to step (b) if both w and z are not equal to zero, otherwise returning ($x_i$, $x_{i-1}$, . . . ,$x_0$) as the base tau expansion, in non-adjacent form, of the modular reduced private signature key x.

11. The method of claim 10, wherein said step of multiplying G by the result of step (e) is comprised of the steps of:

a) computing y=$x_i$G;

b) decrementing i by one;

c) setting y=ty;

d) setting y=y+G if $x_i$=1;

e) setting y=y–G if $x_i$=–1; and f) returning to step (b) for further processing if i=0 otherwise returning y as the product of G and the base tau expansion, in non-adjacent form, of the modular reduced private signature key x.

12. The method of claim 11, wherein said step of reducing k by mod ($\tau^m$–1) in the form of w+z$\tau$ is comprised of the steps of:

a) setting $L_0$=0;

b) setting $L_1$=1;

c) setting i=2;

d) setting $L_i=(-1)^{1-a}L_{i-1}-2L_{i-2}$;

e) determining whether or not i=m;

f) incrementing i by one and returning to step (d) for further processing if i≠m in step (e); and g) setting $j_1$=–2$L_{i-1}$–1, setting $j_2$=$L_i$, and returning $j_1$ and $j_2$ if i=m in step (e).

13. The method of claim 12, further comprising the steps of:

a) setting $n=(j_1{}^2)+(-1)^{1-a}j_1j_2+2(j_2{}^2)$;

b) setting $c=\lfloor(j_1x+(-1)^{1-a}j_2x)/n\rfloor$, where "$\lfloor\ \rfloor$" denotes a function of returning the largest integer not larger than the value contained therein;

c) setting $d=\lfloor -j_2x/n\rfloor$;

d) setting w=x–$j_1$c+2$j_2$d;

e) setting $z=-j_2c-j_1d-(-1)^{1-a}j_2d$; and f) returning w and z.

14. The method of claim 13, wherein said step of generating a base tau expansion, in non-adjacent form, of the result of step (i) is comprised of the steps of:

a) setting i=0;

b) setting $k_i$=0 if w is even, otherwise setting $k_i$=1–z[((w–1+2z)/2) mod 2];

c) setting w=w–$k_i$;

d) setting temp=w;

e) setting $w=(-1)^{1-a}$(temp/2)+z;

f) setting z=(–temp)/2; and g) incrementing, i by one and returning to step (b) if both w and z are not equal to zero, otherwise returning ($k_i$, $k_{i-1}$, . . . ,$k_0$) as the base tau expansion, in non-adjacent form, of the modular reduced private integer k.

15. The method of claim 14, wherein said step of multiplying G by the result of step (j) is comprised of the steps of:

a) computing K=$k_i$G;

b) decrementing i by one;

c) setting K=tK;

d) setting K=K+G if $k_i$=1;

e) setting K=K–G if $k_i$=–1; and f) returning to step (b) for further processing if i=0, otherwise returning K as the product of G and the base tau expansion, in non-adjacent form, of the modular reduced private integer k.

16. A method of verifying a digital signature (R,S) for a message M, comprising the steps of:

a) receiving parameters y, q, M, R, and S;

b) proceeding with the next step if 0<R<q and 0<S<q, otherwise determining that the digital signature is not verified and stopping;

c) forming h=Hash(M), where "Hash" is a secure one-way hash function that is identical to a hash function used to generate S;

d) computing f=((S^–1) mod q);

e) computing b=(hf mod q) and t=(Rf mod q);

f) reducing b by mod ($\tau^m$–1) in the form of w+zt;

g) generating a base tau expansion, in non-adjacent form, of the result of step (f);

h) multiplying G by the result of step (g) to form a point B on an elliptic curve used to generate y, R, and S:

i) reducing t by mod ($\tau^m$–1) in the form of w+zt;

j) generating a base tau expansion, in non-adjacent form, of the result of step (i);

k) multiplying G by the result of step (j) to form a point T on the elliptic curve;

l) computing V=B+T, where V=($V_x$,$V_y$);

m) computing v=($V_x$ mod q); and n) verifying the digital signature if v=R, otherwise not verifying the digital signature.

17. The method of claim 16, wherein said step of reducing b by mod ($\tau^m$–1) in the form of w+z$\tau$ is comprised of the steps of:

a) setting $L_0$=0;

b) setting $L_1$=1;

c) setting i=2;

d) setting $L_i=(-1)^{1-a}L_{i-1}-2L_{i-2}$;

e) determining whether or not i=m;

f) incrementing i by one and returning to step (d) for further processing if i≠m in step (e); and g) setting $j_1$=–2$L_{i-1}$–1, setting $j_2$=$L_i$, and returning $j_1$ and $j_2$ if i=m in step (e).

18. The method of claim 17, further comprising the steps of:

a) setting $n=(j_1{}^2)+(-1)^{1-a}j_1j_2+2(j_2{}^2)$;

b) setting $c=\lfloor(j_1b+(-1)^{1-a}j_2b)/n\rfloor$, where "$\lfloor\ \rfloor$" denotes a function of returning the largest integer not larger than the value contained therein;

c) setting $d=\lfloor -j_2b/n\rfloor$;

d) setting w=b–$j_1$c+2$j_2$d;

e) setting $z=-j_2c-j_1d-(-1)^{1-a}j_2d$; and f) returning w and z.

19. The method of claim 16, wherein said step of generating a base tau expansion, in non-adjacent form, of the result of step (f) is comprised of the steps of:

a) setting i=0;

b) setting $b_i$=0 if w is even, otherwise setting $b_i$=1–z[((w–1+2z)/2) mod 2];

c) setting w=w–$b_i$;

d) setting temp=w;

e) setting $w=(-1)^{1-a}$(temp/2)+z;

f) setting z=(–temp)/2; and g) incrementing i by one and returning to step (b) if both w and z are not equal to zero, otherwise returning ($b_i$, $b_i$, $b_{i-1}$, . . . ,$b_0$) as the base tau expansion, in non-adjacent form, of the modular reduced b.

20. The method of claim 16, wherein said step of multiplying G by the result of step (g) is comprised of the steps of:

a) computing B=$b_i$G;

b) decrementing i by one;

c) setting B=tB;

d) setting B=B+G if $b_i$=1;

e) setting B=B–G if $b_i$=–1; and f) returning to step (b) for further processing if i=0, otherwise returning B as the product of G and the base tau expansion, in non-adjacent form, of the modular reduced b.

21. The method of claim 16, wherein said step of reducing t by mod ($\tau^m$–1) in the form of w+z$\tau$ is comprised of the steps of:

a) setting $L_0=0$;

b) setting $L_1=1$;

c) setting i=2;

d) setting $L_i=(-1)^{1-a}L_{i-1}-2L_{i-2}$;

e) determining whether or not i=m;

f) incrementing i by one and returning to step (d) for further processing if i≠m in step (e); and g) setting $j_1=-2L_{i-1}-1$, setting $j_2=L_i$, and returning $j_1$ and $j_2$ if i=m in step (e).

22. The method of claim 21, further comprising the steps of:

a) setting $n=(j_1\text{^}2)+(-1)^{1-a}j_1j_2+2(j_2\text{^}2)$;

b) setting $c=\lfloor (jt+(-1)^{1-a}j_2t)/n \rfloor$, where "$\lfloor \ \rfloor$" denotes a function of returning the largest integer not larger than the value contained therein;

c) setting $d=\lfloor -j_2t/n \rfloor$;

d) setting $w=t-j_1c+2j_2d$;

e) setting $z=-j_2c-j_1d-(-1)^{1-a}j_2d$; and f) returning w and z.

23. The method of claim 16, wherein said step of generating a base tau expansion, in non-adjacent form, of the result of step (i) is comprised of the steps of:

a) setting i=0;

b) setting $t_i=0$ if w is even, otherwise setting $t_i=1-z[((w-1+2z)/2) \bmod 2]$;

c) setting $w=w-t_i$;

d) setting temp=w;

e) setting $w=(-1)^{1-a}(\text{temp}/2)+z$;

f) setting $z=(-\text{temp})/2$; and g) incrementing i by one and returning to step (b) if both w and z are not equal to zero, otherwise returning ($t_i, t_{i-1}, \ldots, t_0$) as the base tau expansion, in non-adjacent form, of the modular reduced t.

24. The method of claim 16, wherein said step of multiplying G by the result of step (j) is comprised of the steps of:

a) computing $T=t_iG$;

b) decrementing i by one;

c) setting T=tT;

d) setting T=T+G if $t_i=1$;

e) setting T=T−G if $t_i=-1$; and f) returning to step (b) for further processing if i=0, otherwise returning T as the product of G and the base tau expansion, in non-adjacent form, of the modular reduced t.

25. The method of claim 18, wherein said step of generating a base tau expansion, in non-adjacent form, of the result of step (f) is comprised of the steps of:

a) setting i=0;

b) setting $b_i=0$ if w is even, otherwise setting $b_i=1-z[((w-1+2z)/2) \bmod 2]$;

c) setting $w=w-b_i$;

d) setting temp=w;

e) setting $w=(-1)^{1-a}(\text{temp}/2)+z$;

f) setting $z=(-\text{temp})/2$; and g) incrementing i by one and returning to step (b) if both w and z are not equal to zero, otherwise returning ($b_i, b_{i-1}, \ldots, b_0$) as the base tau expansion, in non-adjacent form, of the modular reduced b.

26. The method of claim 25, wherein said step of multiplying G by the result of step (g) is comprised of the steps of:

a) computing $B=b_iG$;

b) decrementing i by one;

c) setting B=tB;

d) setting B=B+G if $b_i=1$, e) setting B=B−G if $b_i=-1$; and f) returning to step (b) for further processing if i=0, otherwise returning B as the product of G and the base tau expansion, in non-adjacent form of the modular reduced b.

27. The method of claim 26, wherein said step of reducing t by mod ($\tau^m-1$) in the form of w+zτ is comprised of the steps of:

a) setting $L_0=0$;

b) setting $L_1=1$;

c) setting i=2;

d) setting $L_i=(-1)^{1-a}L_{i-1}-2L_{i-2}$;

e) determining whether or not i=m;

f) incrementing i by one and returning to step (d) for further processing if i≠m in step (e); and g) setting $j_1=-2L_{i-1}-1$, setting $j_2=L_i$, and returning $j_1$ and $j_2$ if i=m in step (e).

28. The method of claim 27, further comprising the steps of:

a) setting $n=(j\text{^}2)+(-1)^{1-a}j_1j_2+2(j_2\text{^}2)$;

b) setting $c=\lfloor (j_1t+(-1)^{1-a}j_2t)/n \rfloor$, where "$\lfloor \ \rfloor$" denotes a function of returning the largest integer not larger than the value contained therein;

c) setting $d=\lfloor -j_2t/n \rfloor$;

d) setting $w=t-j_1c+2j_2d$;

e) setting $z=-j_2c-j_1d\ d-(-1)^{1-a}j_2d$; and f) returning w and z.

29. The method of claim 28, wherein said step of generating a base tau expansion in non-adjacent form, of the result of step (i) is comprised of the steps of:

a) setting, i=0;

b) setting $t_i=0$ if w is even, otherwise setting $t_i=1-z[((w-1+2z)/2) \bmod 2]$;

c) setting $w=w-t_i$;

d) setting temp=w;

e) setting $w=(-1)^{1-a}(\text{temp}/2)+z$;

f) setting $z=(-\text{temp})/2$; and g) incrementing i by one and returning to step (b) if both w and z are not equal to zero, otherwise returning ($t_i, t_{i-1}, \ldots, t_0$) as the base tau expansion, in non-adjacent form, of the modular reduced t.

30. The method of claim 29, wherein said step of multiplying G by the result of step (j) is comprised of the steps of:

a) computing $T=t_iG$;

b) decrementing i by one;

c) setting T=tT;

d) setting T=T+G if $t_i=1$;

e) setting T=T−G if $t_i=-1$; and f) returning to step (b) for further processing if i=0, otherwise returning T as the product of G and the base tau expansion, in non-adjacent form, of the modular reduced t.

\* \* \* \* \*